US012677205B2

(12) United States Patent
Esswie et al.

(10) Patent No.: US 12,677,205 B2
(45) Date of Patent: Jul. 7, 2026

(54) SELECTING OR ACCESSING A NEXT-BEST NODE BASED A CRITERION BEING SATISFIED WITH RESPECT TO A FAKE BASE STATION

(71) Applicant: Dell Products, L.P., Round Rock, TX (US)

(72) Inventors: Ali Esswie, Calgary (CA); Sheng Sun, Kanata (CA); Ibrahim Abu Alhaol, Nepean (CA); Gwenael Poitau, Montreal (CA)

(73) Assignee: Dell Products L.P., Round Rock, TX (US)

( * ) Notice: Subject to any disclaimer, the term of this patent is extended or adjusted under 35 U.S.C. 154(b) by 323 days.

(21) Appl. No.: 18/484,113

(22) Filed: Oct. 10, 2023

(65) Prior Publication Data

US 2025/0119817 A1 Apr. 10, 2025

(51) Int. Cl.
*H04W 48/02* (2009.01)
*H04W 12/122* (2021.01)

(52) U.S. Cl.
CPC ......... *H04W 48/02* (2013.01); *H04W 12/122* (2021.01)

(58) Field of Classification Search
CPC ............................. H04W 48/02; H04W 12/122
See application file for complete search history.

(56) References Cited

U.S. PATENT DOCUMENTS

| | | | |
|---|---|---|---|
| 2018/0332474 A1* | 11/2018 | Johansson ........... | H04W 56/004 |
| 2020/0145821 A1* | 5/2020 | Lee ........................ | H04W 48/12 |
| 2020/0236554 A1* | 7/2020 | Lee ........................ | H04W 12/03 |
| 2020/0288320 A1* | 9/2020 | Kunz .................. | H04L 63/0892 |
| 2023/0283510 A1* | 9/2023 | Yapici .................. | H04B 1/0475 |
| | | | 375/262 |
| 2024/0032115 A1* | 1/2024 | Wu .................... | H04W 74/0841 |
| 2024/0064517 A1* | 2/2024 | Yapici ................. | H04L 63/1491 |

FOREIGN PATENT DOCUMENTS

| | | | | | |
|---|---|---|---|---|---|
| EP | | 4002903 A1 * | 5/2022 | ............ | H04W 24/08 |

* cited by examiner

*Primary Examiner* — Mewale A Ambaye

(74) *Attorney, Agent, or Firm* — Amin, Turocy & Watson, LLP

(57) ABSTRACT

A legitimate radio access network node may determine fake base station barring criteria that may be transmitted to a user equipment in a fake base station barring configuration. The user equipment may analyze information or signal characteristics corresponding to a signal associated with another node with respect to criteria contained in the fake base station barring configuration. The barring criteria may include a signal strength threshold or a timing advance threshold. If the analyzed information or signal characteristics satisfy barring criteria contained in the barring configuration, the user equipment may determine that the other node is a fake base station and may avoid selecting, or accessing, the other node. The user equipment may flush radio resource control configuration information corresponding to the fake base station. The user equipment may select or access a next-best node based on the barring criteria being satisfied with respect to the determined fake based station.

20 Claims, 15 Drawing Sheets

300

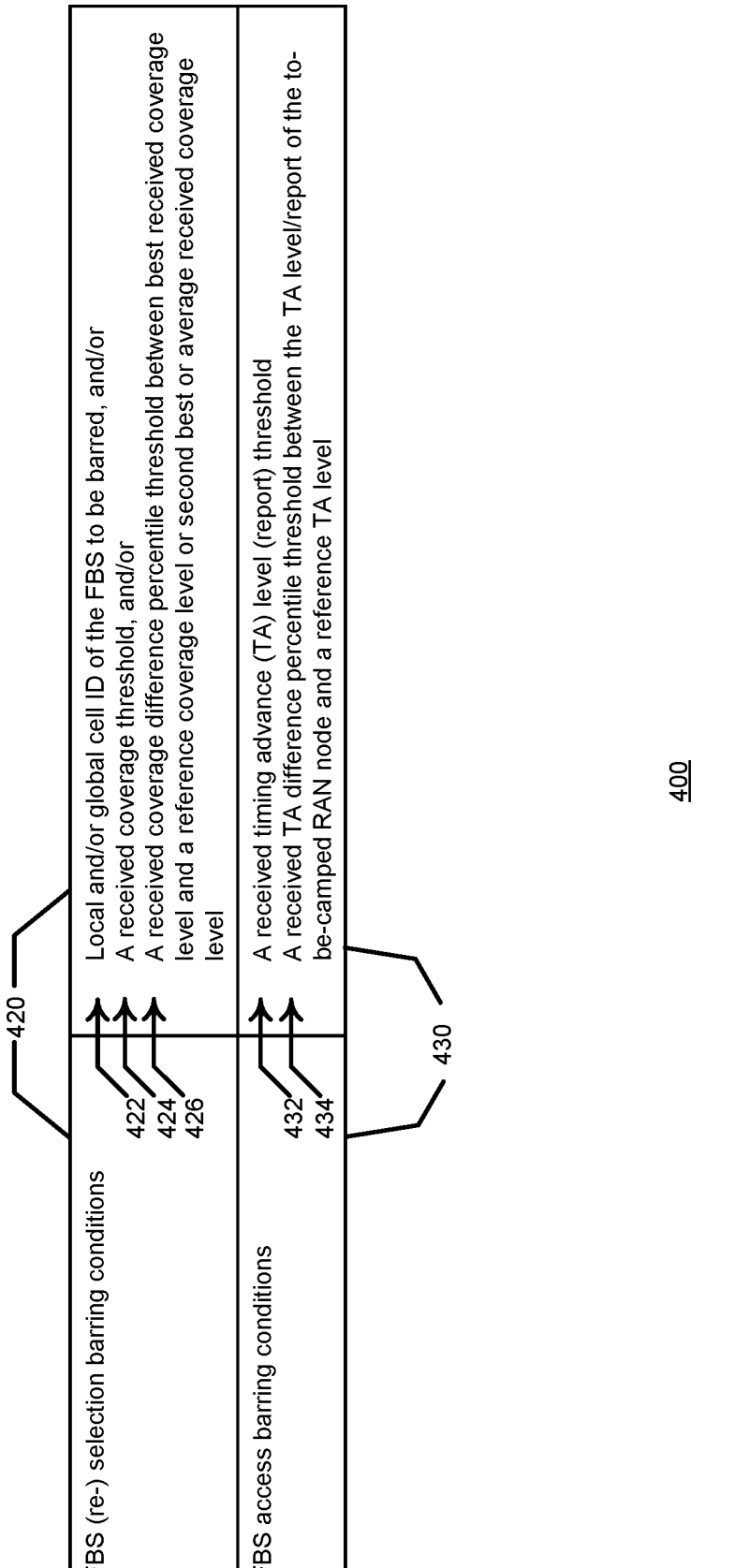

FBS (re-) selection barring conditions

Local and/or global cell ID of the FBS to be barred, and/or

A received coverage threshold, and/or

A received coverage difference percentile threshold between best received coverage level and a reference coverage level or second best or average received coverage level FBS access barring conditions A received timing advance (TA) level (report) threshold A received TA difference percentile threshold between the TA level/report of the to-be-camped RAN node and a reference TA level

420

422

424

426

432

434

430

600

700

Figure 11:
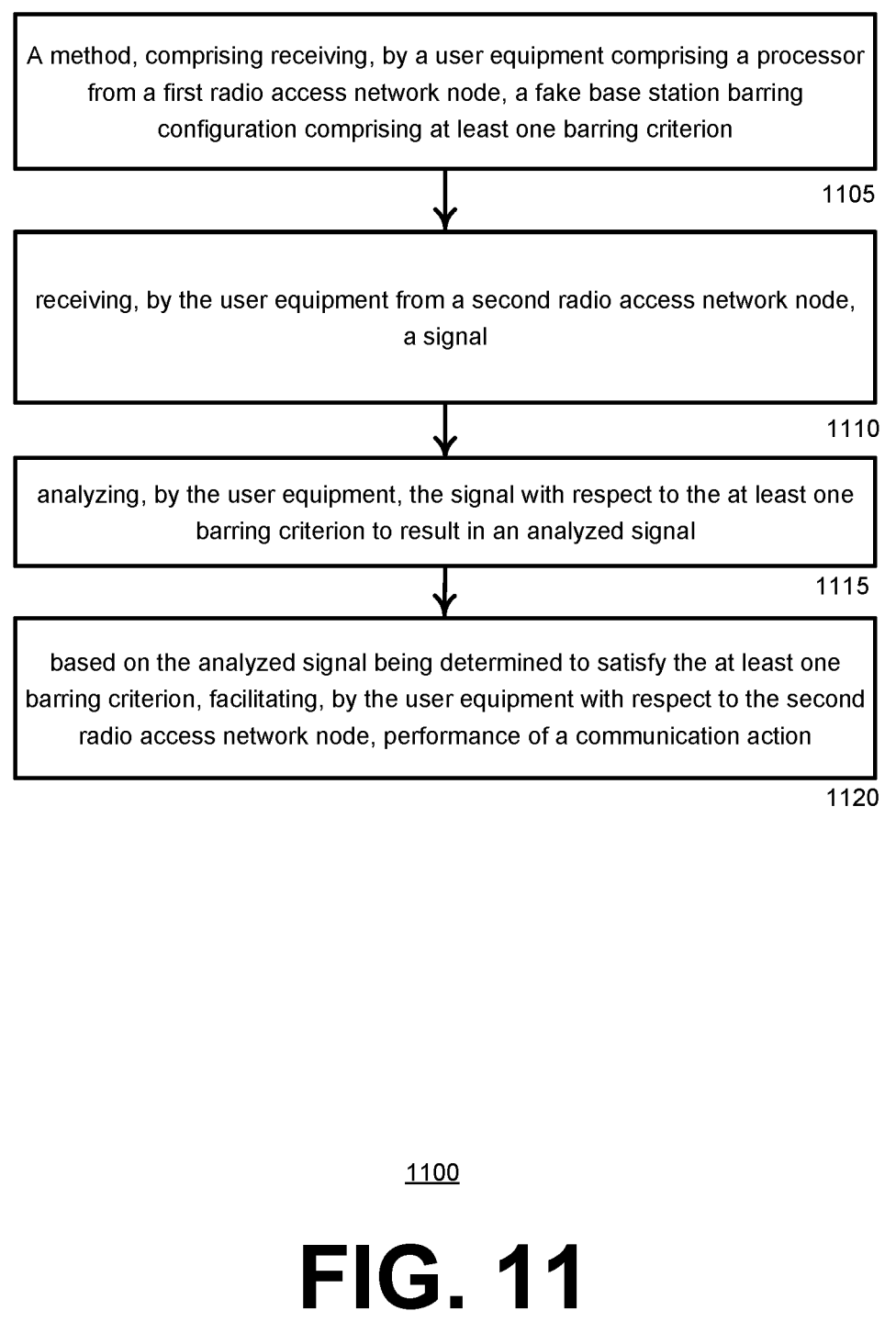

A method, comprising receiving, by a user equipment comprising a processor from a first radio access network node, a fake base station barring configuration comprising at least one barring criterion

1105 receiving, by the user equipment from a second radio access network node, a signal

1110 analyzing, by the user equipment, the signal with respect to the at least one barring criterion to result in an analyzed signal

1115 based on the analyzed signal being determined to satisfy the at least one barring criterion, facilitating, by the user equipment with respect to the second radio access network node, performance of a communication action

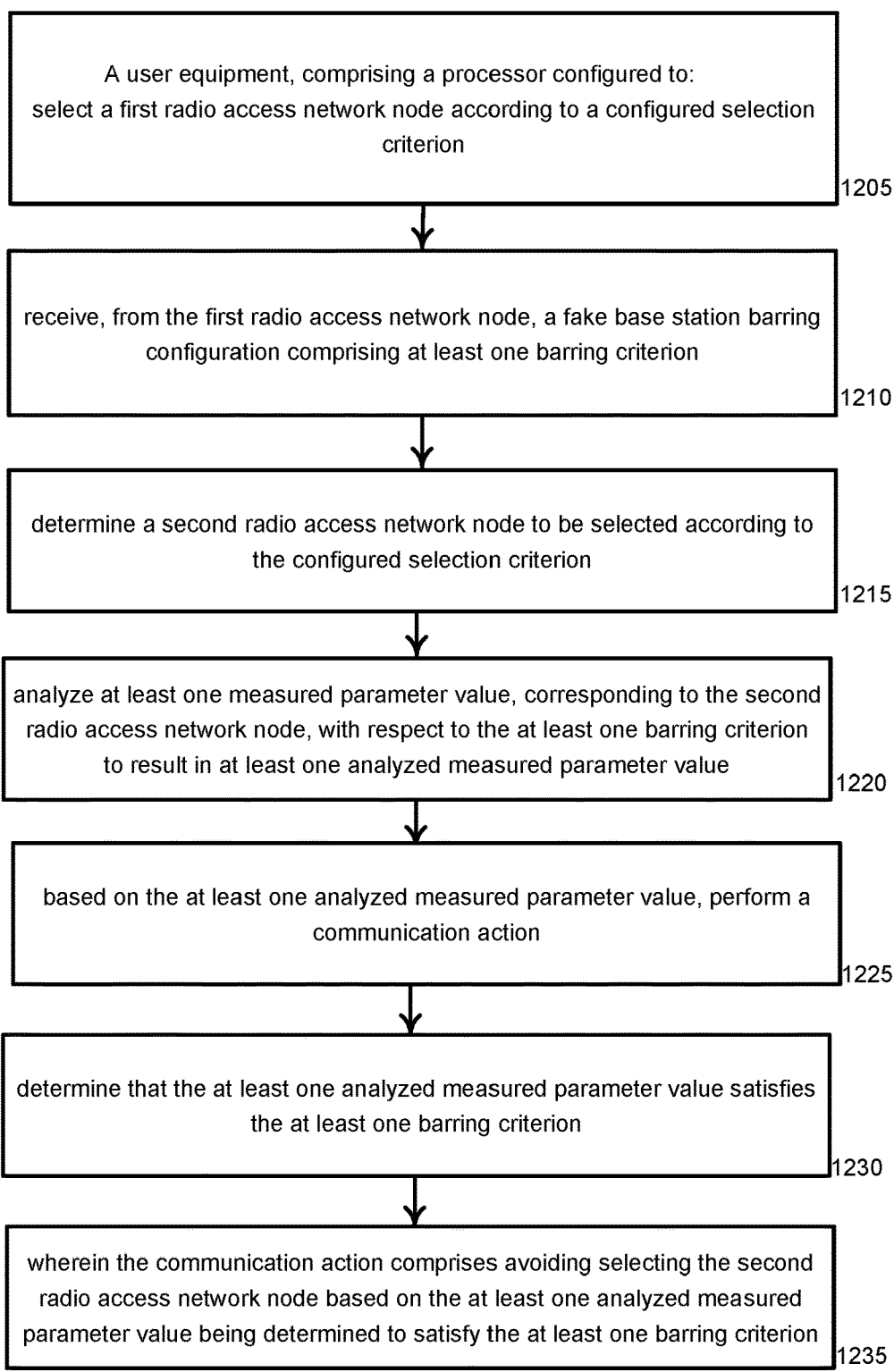

A user equipment, comprising a processor configured to:
select a first radio access network node according to a configured selection criterion

1205 receive, from the first radio access network node, a fake base station barring configuration comprising at least one barring criterion

1210 determine a second radio access network node to be selected according to the configured selection criterion

1215 analyze at least one measured parameter value, corresponding to the second radio access network node, with respect to the at least one barring criterion to result in at least one analyzed measured parameter value

1220 based on the at least one analyzed measured parameter value, perform a communication action

1225 determine that the at least one analyzed measured parameter value satisfies the at least one barring criterion

1230 wherein the communication action comprises avoiding selecting the second radio access network node based on the at least one analyzed measured parameter value being determined to satisfy the at least one barring criterion

Figure 13:
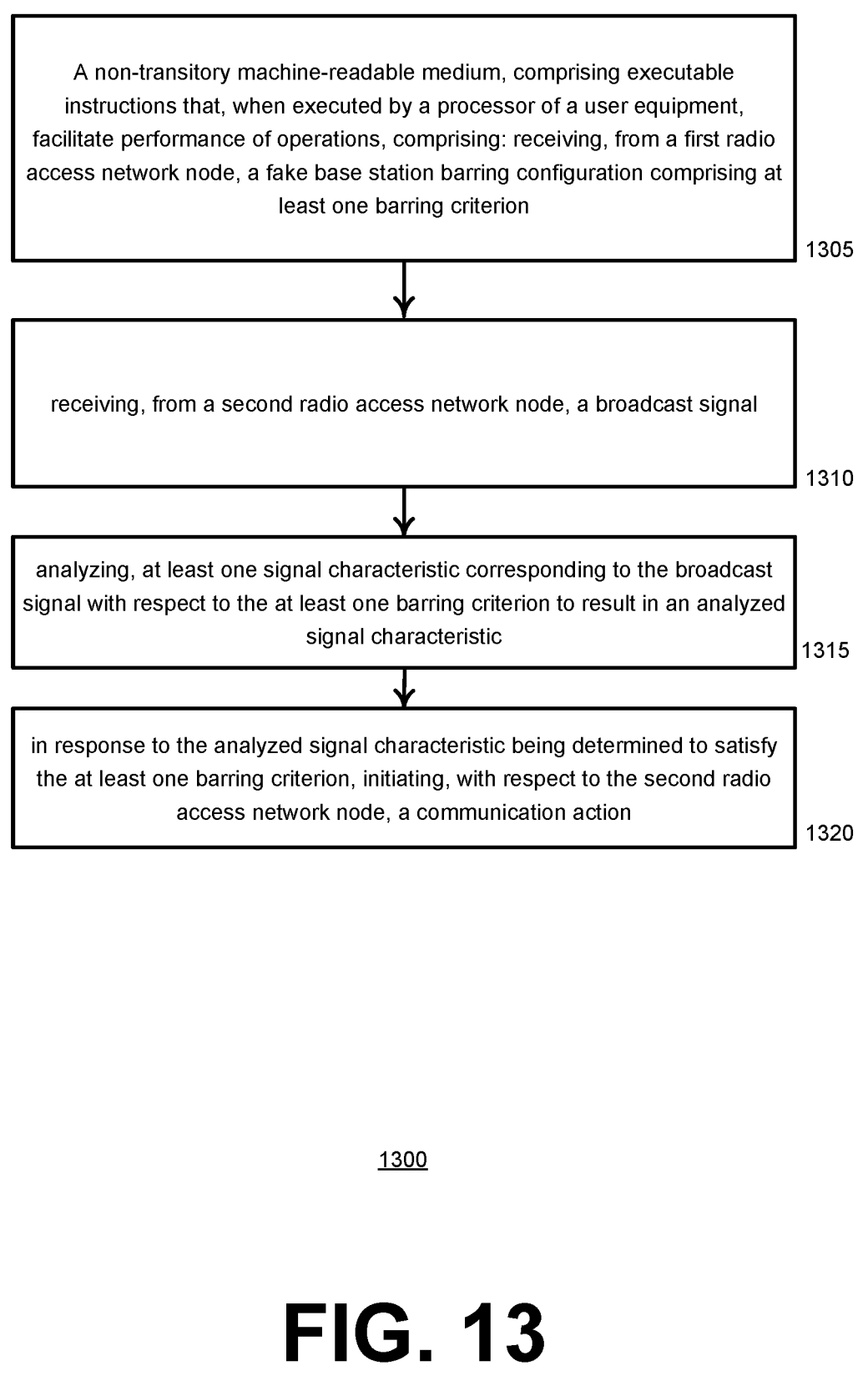

A non-transitory machine-readable medium, comprising executable instructions that, when executed by a processor of a user equipment, facilitate performance of operations, comprising: receiving, from a first radio access network node, a fake base station barring configuration comprising at least one barring criterion

1305 receiving, from a second radio access network node, a broadcast signal

1310 analyzing, at least one signal characteristic corresponding to the broadcast signal with respect to the at least one barring criterion to result in an analyzed signal characteristic

1315 in response to the analyzed signal characteristic being determined to satisfy the at least one barring criterion, initiating, with respect to the second radio access network node, a communication action

SELECTING OR ACCESSING A NEXT-BEST NODE BASED A CRITERION BEING SATISFIED WITH RESPECT TO A FAKE BASE STATION

BACKGROUND

The 'New Radio' (NR) terminology that is associated with fifth generation mobile wireless communication systems ("5G") refers to technical aspects used in wireless radio access networks ("RAN") that comprise several quality-of-service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

Nefarious actors may deploy wireless devices that pose as base stations that are part of a legitimate mobile network operator's network (e.g., a Public Land mobile Network ("PLMN")), but in fact are not legitimate parts of a mobile network operator's network. The illegitimate devices may seek to attract a user equipment to attempt to connect to the devices to obtain personal information of a user of the user equipment attempting to connect to the illegitimate devices, or to obtain information corresponding to a mobile network operator, such as security credentials. An illegitimate device posing as a legitimate base station (e.g., posing as a legitimate RAN node) may be referred to as a fake base station, a false base station, or a fake RAN node. Other terminology that may refer to a fake base station may include 'an IMSI-catcher,' a 'cellular phone surveillance device,' 'rogue base station.' or 'cell site simulator.'

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise receiving, by a user equipment comprising a processor from a first radio access network node, a fake base station barring configuration comprising at least one barring criterion and receiving, by the user equipment from a second radio access network node, a signal. The method may further comprise analyzing, by the user equipment, the signal with respect to the at least one barring criterion to result in an analyzed signal and, based on the analyzed signal being determined to satisfy the at least one barring criterion, facilitating, by the user equipment with respect to the second radio access network node, performance of a communication action.

In an embodiment, the communication action may comprise overriding a configured communication action criterion and avoiding selecting the second radio access network node. The at least one barring criterion may comprise a signal strength coverage criterion.

In an embodiment, the communication action may comprise overriding applicability of a configured communication action criterion, such as a conventional criterion that specifies that a user equipment connect to a node corresponding to a strongest signal strength and avoiding connecting to the second radio access network node. The at least one barring criterion may comprise a timing advance criterion or a noise floor criterion.

The second radio access network node may correspond to a first signal strength. The configured communication action criterion may specify connection, by the user equipment, to one of a set of radio access network nodes. The user equipment may determine the set of radio access network nodes based on respective signal strengths corresponding to the nodes being above a configured signal strength threshold. The user equipment may determine the one of the set of nodes based on the one of the set of nodes corresponding to a strongest signal strength of the respective signal strengths. The method may further comprise initiating, by the user equipment, establishing a connection with a third radio access network node that corresponds to a second signal strength that is less strong than the first signal strength.

In an embodiment, the fake base station barring configuration may be received from the first radio access network node via a radio resource control release message.

In an embodiment, the fake base station barring configuration may be received from the first radio access network node via a system information block message.

In an embodiment, the fake base station barring configuration may be a first fake base station barring configuration, the method may further comprise receiving, by the user equipment from a third radio access network node, a second fake base station barring configuration, and determining, by the user equipment, that the first fake base station barring configuration and the second fake base station barring configuration are the same configuration, or comprise the same configuration information, before the performance of the communication action. Performance of the communication action may be based on the first fake base station barring configuration and the second fake base station barring configuration having been determined to be the same configuration.

In an embodiment, the communication action may comprise overriding, with the first fake base station barring configuration, a third fake base station barring configuration, wherein the user equipment received the third fake base station barring configuration before receiving the first fake base station barring configuration or the second fake base station barring configuration. The overing of the third fake base station configuration may be based on the first fake base station barring configuration and the second fake base station barring configuration having been determined to be the same configuration.

In an embodiment, the fake base station barring configuration may be a first fake base station barring configuration and the method may further comprise receiving, by the user equipment from a third radio access network node, a second fake base station barring configuration, and determining, by the user equipment, that the first fake base station barring configuration and the second fake base station barring configuration are different configurations before the performance of the communication action. The performance of the communication action may be based on the first fake base station barring configuration and the second fake base station barring configuration having been determined to be different. The performance of the communication action may comprise avoiding operation with respect to the third radio access network node according to the first fake base station barring configuration.

In an embodiment, the at least one barring criterion may comprise an identifier corresponding to the second radio access network node. The communication action may comprise avoiding selecting the second radio access network node based on an identifier associated with the signal received from the second node being the same as the identifier corresponding to the second radio access network node in the fake base station barring configuration.

In another example embodiment, a user equipment may comprise a processor configured to select a first radio access network node according to a configured selection criterion and receive, from the first radio access network node, a fake base station barring configuration comprising at least one barring criterion. The processor may be further configured to determine a second radio access network node to be selected according to the configured selection criterion and to analyze at least one measured parameter value, corresponding to the second radio access network node, with respect to the at least one barring criterion to result in at least one analyzed measured parameter value. Based on the at least one analyzed measured parameter value, the processor may be further configured to perform a communication action.

In an embodiment, the processor may be further configured to determine that the at least one analyzed measured parameter value satisfies the at least one barring criterion. The communication action may comprise avoiding selecting the second radio access network node based on the at least one analyzed measured parameter value being determined to satisfy the at least one barring criterion.

The at least one measured parameter value, corresponding to the second radio access network node, may be at least one first measured parameter value. The at least one analyzed measured parameter value may comprise a first analyzed parameter value. The communication action may be a first communication action. The processor may be further configured to determine a third radio access network node to be selected according to the configured selection criterion and to analyze at least one second measured parameter value, corresponding to the third radio access network node, with respect to the at least one barring criterion to result in at least one second analyzed measured parameter value. Based on the at least one second analyzed measured parameter value being determined not to satisfy the at least one barring criterion, the processor may be further configured to select the third radio access network node. The processor may be further configured to establish, with the third radio access network node, a communication session and to transmit, to the third radio access network node, an identifier corresponding to the second radio access network node to be usable by the third radio access network node to facilitate updating the fake base station barring configuration to result in an updated fake base station barring configuration that comprises an indication that the second radio access network node is a barred fake base station.

In yet another embodiment, a non-transitory machine-readable medium may comprise executable instructions that, when executed by a processor of a user equipment, facilitate performance of operations, comprising receiving, from a first radio access network node, a fake base station barring configuration comprising at least one barring criterion and receiving, from a second radio access network node, a broadcast signal. The operations may further comprise analyzing, at least one signal characteristic corresponding to the broadcast signal with respect to the at least one barring criterion to result in an analyzed signal characteristic and, in response to the analyzed signal characteristic being determined to satisfy the at least one barring criterion, initiating, with respect to the second radio access network node, a communication action.

The at least one barring criterion may comprise a configured timing advance. The analyzed signal characteristic may comprise a measured timing advance value corresponding to the second radio access network node. Satisfaction of the at least one barring criterion may comprise the measured timing advance value corresponding to the second radio access network node being determined not to exceed, or failing to exceed, the configured timing advance. The communication action may comprise avoiding establishing a communication session with the second radio access network node.

In an embodiment, the second radio access network node may correspond to a first signal strength. The communication action may further comprise establishing a communication session with a third radio access network node that corresponds to a second signal strength, wherein the first signal strength is greater, or stronger, than the second signal strength.

In an embodiment, the operations may further comprise transmitting, to the third radio access network node, the first signal strength, the measured timing advance value corresponding to the second radio access network node, and an identifier corresponding to the second radio access network node to be usable by the third radio access network node to facilitate updating a fake base station barring configuration learning model to result in an updated fake base station barring configuration.

BRIEF DESCRIPTION OF THE DRAWINGS

FIG. 4 illustrates an example fake base station barring configuration.

FIG. 11 illustrates a block diagram of an example method.

FIG. 12 illustrates a block diagram of an example user equipment.

FIG. 13 illustrates a block diagram of an example non-transitory machine-readable medium.

DETAILED DESCRIPTION OF THE DRAWINGS

Figure 1:
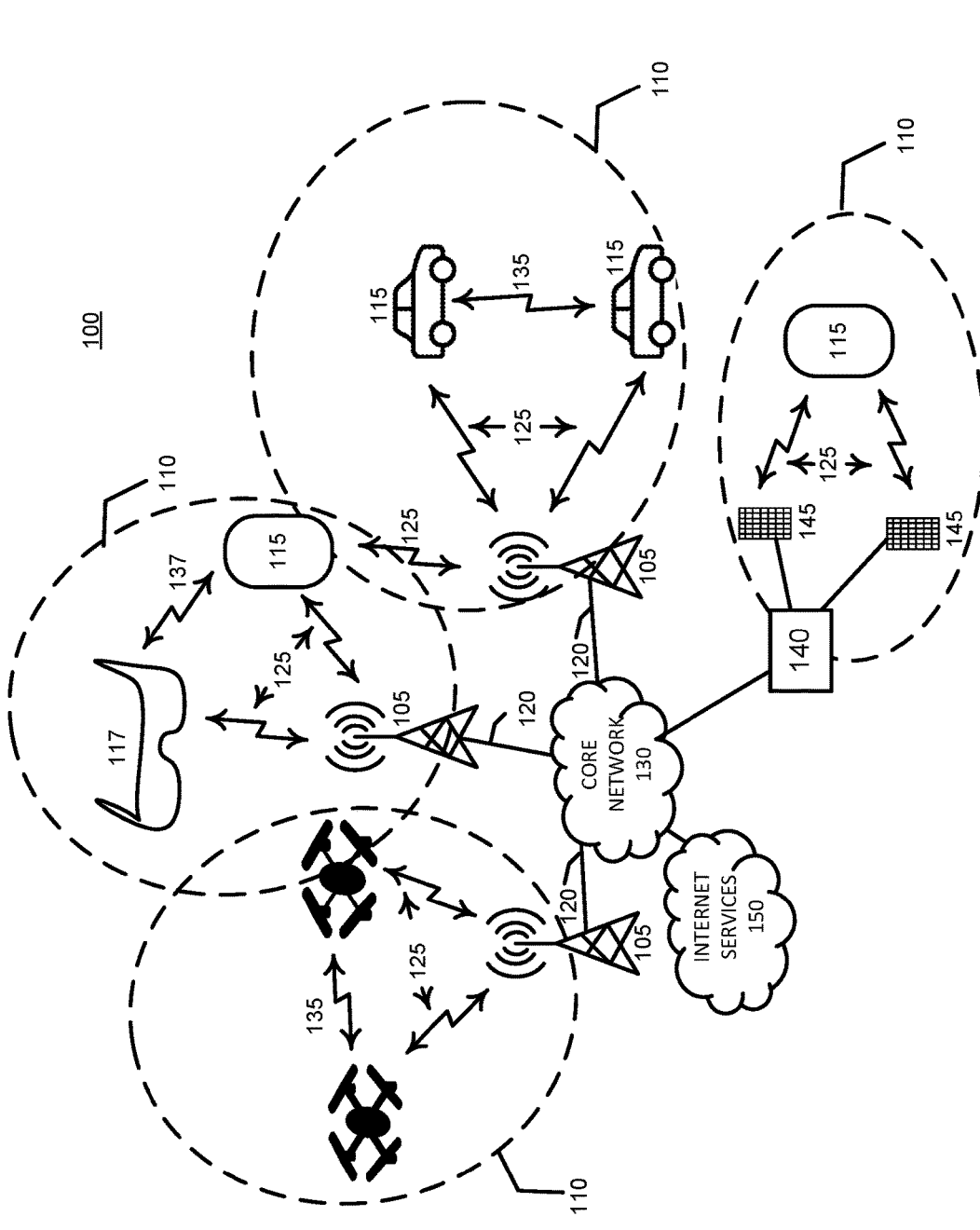
FIG. 1 illustrates a wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Artificial intelligence ("AI") and machine learning ("ML") models may facilitate performance and operational functionality and improvements in 5G implementation, such as, for example, network automation, optimizing signaling overhead, energy conservation at devices, and traffic-capacity maximization. An artificial intelligence machine learning models ("AI/ML model") functionality can be implemented and structured in many different forms and with varying vendor-proprietary designs. A 5G radio access network node ("RAN") of a network to which the user equipment may be attached or with which the user equipment may be registered may manage or control real-time AI/ML model performance at different user equipment devices for various radio functions.

A network RAN can dynamically control activation, deactivation, triggering of model retraining (that may be radio-function-specific), or updating of a learning model depending on monitoring and analysis of defined real-time performance metrics corresponding to a learning model being executed at a user equipment. It will be appreciated that even though a learning model may be implementing a particular radio function, metrics that are monitored or analyzed may be learning model metrics, not necessarily radio function metrics (e.g., a mathematical/statistical metric not necessarily a radio function metric such as, for example, signal strength).

Fake base-station ("FBS") deployments are considered a security risk of and to current cellular wireless communication systems. A typical FBS deployment may be implemented by a non-legitimate and low-capability base station (e.g., low processing power and low sophistication) within a signal coverage range of a legitimate cellular network node, with the objective of either collecting user equipment device information or installing harmful software on user equipment. For example, a vehicle-mounted moving FBS can deceive idle mode user equipment devices by appearing to the user equipment as a legitimate RAN node to be selected/re-selected, because the user equipment is likely to receive much better coverage levels (e.g., signal strength) from a very nearby FBS than from a farther away legitimate RAN nodes, thus misleading idle mode user equipment devices to select/re-select the FBS instead of available legitimate RAN nodes. Upon detecting a present FBS within a certain coverage of the legitimate network, current FBS prevention measures comprise manual intervention, where the FBS (and its mounting vehicle) are detected manually with radio scanners. Conventional techniques do not support dynamic FBS access prevention (e.g., avoiding a node based on determining in real time that a node is an active FBS). Using conventional techniques typically results in costly, slow, and unreliable FBS operation prevention.

According to embodiments disclosed herein, new signaling procedures may support dynamic FBS access prevention, wherein idle mode user equipment devices are dynamically configured from a legitimate RAN node with potential FBS selection barring or access barring criteria. According to embodiments disclosed herein at least one legitimate base station/RAN node may have already detected a FBS within a certain coverage area and may compile and broadcast FBS access barring configuration information towards user equipment to be usable by idle mode user equipment to avoid selecting/re-selecting/camping on, or accessing, an active FBS. Unlike with conventional techniques, where idle mode devices are configured with a first set of coverage conditions to trigger cell selection or re-selection towards any detected RAN nodes, embodiments disclosed herein facilitate legitimate base stations/RAN nodes dynamically configuring user equipment devices with a set of RAN node barring conditions (either for preemptively stopping cell selection/re-selection or stopping cell access on the potential FBS) in addition to conventional barring information. Such a second set of conditions, in an embodiment, may include an identifier associated with a detected FBS with which idle mode user equipment are to avoid selecting/re-selecting or camping, regardless of the corresponding received coverage level (e.g., even if the identified base station satisfies conventional cell selection/re-selection conditions). In another embodiment, the second set of FBS barring conditions may comprise one or more radio performance thresholds, for example coverage differential thresholds or timing advance thresholds, that when satisfied the user equipment is/are to stop or avoid accessing an identified/targeted RAN node, even though a received coverage level corresponding to the identified/targeted RAN node satisfies conventional access criteria. Thus, upon detection of a present FBS, legitimate RAN nodes can dynamically facilitate avoiding, by idle mode user equipment devices located in a signal strength range of such FBS, from accessing/selecting/re-selecting the identified FBS. Accordingly, using embodiments disclosed herein may facilitate more dynamic, less costly, and faster FBS selection/access prevention than using conventional techniques. Embodiments disclosed herein may comprise novel idle mode signaling messages to deliver FBS selection/re-selection/access barring configurations to user equipment. Embodiments disclosed herein may comprise novel idle mode user equipment device behavior wherein idle mode devices override standard cell selection/re-selection criteria with FBS access barring configuration information, and thus may stop/halt access/selection/re-selection to a FBS and flush information corresponding thereto, when FBS barring criterion/criteria in a fake base station barring configuration has been configured in the user equipment.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range k wireless link 125, or the UE/V R appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 14.

Continuing with discussion of FIG. 1, base stations 105 may be dispersed throughout a geographic area to form the wireless communication system 100 and may be devices in different forms or having different capabilities, Base stations 105 and UEs 115 may wirelessly communicate via one or more communication links 125. A base station 105 may be referred to as a RAN node. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, a wireless transmit receive unit ("WTRU"), or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs. or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g. a bandwidth part (BWP)) that is operated according to one or more physical layer channels for a given radio access technology (e.g. LTE. LIE-A. LTE-A Pro, NR). Each physical layer channel may carry acquisition signaling (e.g. synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier band width may be one of a number of determined bandwidths for carriers of a particular radio access technology (e.g., 1.4, 3, 5, 10, 15, 20, 40, or 80 megahertz (MHz)). Devices of the wireless communication system 100 (e.g. the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCMI) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFM) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., N) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORE-SET)) for a physical control channel may be defined by a number of symbol periods and may extend across the system bandwidth or a subset of the system bandwidth of the carrier. One or more control regions (e.g. CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others), In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the ULs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or more component carriers.

In some examples, a carrier may support multiple cells, and different cells may be configured according to different protocol types (e.g. MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (UR-LLC) or mission critical communications, UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a IE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 G Hz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTL-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions. P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIME) communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MINO), where multiple spatial layers are transmitted to the same receiving device, and multiple-user MIMO (MU-MIMI), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g. a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitter device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single bear direction nay be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g. by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UE's 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

It is desirable to protect against attacks by fake base stations. 5G NR Radio Resource Control ("RRC") signaling typically comprises a master information block ("MIB") message and System Information Block ("SIB") messages that may be used to facilitate, or that may be vulnerable to, FBS attacks. Multiple types, or versions, of SIB messages may be transmitted by a RAN during an RRC procedure with a UE that is attempting to establish a connection with the RAN. Different SIB types may be referred to by different numerical identifiers, for example, an SIB1 message, an SIB2 message, an SIB3 message, and so on. An MIB message or an SIB1 message may be referred to as, or may comprise what is referred to as, minimum system information. Other SIB messages may be used to transmit system information during RRC connection establishment.

An MIB may carry, or comprise, channel bandwidth information, PHICH configuration information; transmit power information, number of antenna information, and SIB scheduling information transmitted. An SIB may be transmitted via a downlink shared channel. A system information container ("S1") may comprise multiple SIBs. Different S1 containers may be transmitted at different frequencies and with sub-frames. SIB messages may be transmitted via a broadcast control channel ("BCCH").

A fake base station is a device that may be operated for nefarious purposes and that may masquerade as a real cell base station/RAN node to tap into mobile communications, which may pose a risk to user equipment and communication networks, such as, for example, 4G, 5G, 6G, or other wireless network that may operate an Open Radio Access Network ("Open-RAN") platform or operating system. An FBS, also known as an International Mobile Subscriber Identity ("IMSI") catcher, is a threat to cellular wireless communication networks. Typical FBS implementation involves setting up a Software Defined Radio ("SDR") to broadcast fake cellular information or to masquerade as a legitimate cell tower/RAN node in an adjacent area. Conventional protection techniques focus on post-authentication protection, thus broadcast signalling is not protected or authenticated, and thus a wide range of attacks are potentially present. Conventional techniques used in 5G wireless networks may implement Subscription Permanent Identity and Concealed Identity ("SUPI/SUCI") to thwart IMSI catcher attacks. However, many FBS attacks do not aim to grab an identifier corresponding to a subscriber, instead serving as a scamming station to 'blast out' scamming short message service messages ("SMS"), for example text messages. Tracing and tracking down a FBS that transmits many SMS messages may require mechanisms or techniques that involve collaboration from user equipment devices. Since most fake base stations are facilitated by an SDR, fake cells typically exhibit different radio profile characteristics than a legitimate, true hardware-based base station/RAN node, and operation of a FBS is often sporadic. Differences between characteristics of a FBS as compared to operation of a legitimate RAN node may be used to determine a probability of a FBS being in an area. A RAN node being capable of anticipating such differences or variations in operational characteristics, for example based on a measurement report generated by a user equipment, would facilitate detecting a FBS with low cost.

Using conventional techniques, upon detecting an FBS within an area, existing FBS access prevention schemes involve manual intervention. For example, a mobile network operator may manually pursue a location corresponding to an FBS, which is likely to be mounted on a moving vehicle. Thus, conventional FBS prevention techniques are inefficient and costly. According to embodiments disclosed herein, upon detecting an active FBS within a coverage area, which detection may be based on intelligent FBS detection learning models, a legitimate RAN node may dynamically configure idle mode user equipment devices with dynamic FBS access/selection/re-selection barring conditions/criteria, which may facilitate idle mode user equipment devices in avoid selecting, or connecting to, an active FBS.

Typical defenses to protect against an attack by a fake base station, which a user equipment may be targeting to select/reselect or connect to, may comprise the targeted RAN node and user equipment verifying the identity of the other as being legitimate (e.g., mutual authentication), changing frequencies (e.g., frequency hopping), and equipment or systems designed to detect intrusions by fake base stations. Artificial Intelligence ("AI") and machine learning ("ML") can facilitate these defensive techniques and technologies. AI/ML can improve identity checks by learning how real base stations behave, smartly selecting secure frequencies for better hopping, and quickly scanning a large amount of network data to accurately detect fake base stations. For user equipment devices that are idle, AI/ML can facilitate the user equipment avoid connecting to an FBS by monitoring a local radio environment for suspicious stations, helping the device determine whether nearby stations are real, and using smart reselection processes to guide idle user equipment devices towards real base stations.

Safeguarding against fake FBS poses unique problems to user equipment in idle mode, or standby mode. User equipment in idle mode or standby mode operate in a power-conservation-focused mode, which limits power and processor use and restricts the ability of the use equipment to execute complex tasks such as radio environment scanning or advanced cryptographic operations, thus reducing the ability to determine that a signal broadcast from a RAN node is coming from an FBS. Furthermore, the absence of continuous network monitoring and rare re-authentication make idle/standby mode user equipment devices more susceptible to FBS attacks than user equipment in an active or connected mode. AI and ML learning models can facilitate idle/standby user equipment, using embodiments disclosed herein, in determining whether a signal is being received from a FBS by efficiently using scarce resources available to idle mode user equipment devices by facilitating security checks without significantly impacting power use or device performance. In addition, a user equipment may use an AI/ML model to continuously monitor a radio environment to identify anomalies that may be indicative of FBS infiltration. An AI/ML model may use adaptive reselection techniques, enabling idle devices to smartly select base stations and avoid being trapped into selecting or connecting to an FBS.

Dynamic Fake Base Station Idle Mode Barring

Embodiments disclosed herein may use novel idle mode signaling procedures to facilitate dynamic prevention of FBS access/selection/re-selection by user equipment in an idle mode or standby mode. In an embodiment, one or more legitimate base stations/RAN nodes may detect the presence of an active FBS within a certain coverage area. Such determination may be facilitated by AI/ML detection learning models. Depending on FBS AI/ML model detection accuracy and complexity at a legitimate base station/RAN node, a legitimate base station may become aware of information corresponding to an active FBS. Examples may include an absolute local or global cell identifier corresponding to an active FBS, or a radio performance profile corresponding to an active FBS, with respect to which a legitimate RAN node may become aware or may generate estimates, or predictions, of various radio conditions at a user equipment that may be attempting connection establishment. For example, a legitimate base station/RAN node that has detected an active FBS may predict or estimate a certain received coverage level/range or timing advance level/range, that should be experienced at an idle mode device that is camping on the FBS. A FBS radio profile is typically quite distinctive from a radio profile corresponding to a surrounding legitimate base station due to the active FBS being much closer to the idle mode devices or having an antenna being at a different height, (e.g., an FBS antenna mounted in or on a vehicle) than an antenna of a legitimate RAN node cell tower. A legitimate base station RAN node may use an estimate or prediction of a FBS radio profile in guiding an idle mode user equipment device in avoiding selection/re-selection/camping of the FBS. Thus, on condition of determining or predicting a radio profile of a FBS, a legitimate base station/RAN node may broadcast a set of FBS barring conditions, or criteria, in a fake base station barring configuration, usable by a user equipment in testing one or more signals received from a legitimate RAN node before selection/re-selection, or camping with respect to the legitimate RAN node.

In an embodiment, if a legitimate RAN node broadcasts a barred FBS identifier in a fake base station barring configuration, an idle mode user equipment device that receives the fake base station barring configuration may consider a RAN node corresponding to the barred FBS identifier as barred, and therefore may disregard the barred FBS from cell selection/re-selection or camping process regardless of the barred fake base station's corresponding received coverage level.

In another embodiment, a legitimate base station/RAN node may broadcast a cell selection/re-selection barring condition set/criterion set in an fake base station barring configuration, wherein an idle mode user equipment device that receives the fake base station barring configuration may check, or analyze, a signal characteristic corresponding to a signal broadcast by a targeted, to-be-selected, RAN node with respect to information or a criterion in the fake base station barring configuration. For example, a legitimate RAN node may configure idle mode user equipment devices to bar selecting or re-selecting a RAN node if a corresponding received coverage is above a predefined threshold (e.g., a signal strength corresponding to a to-be-selected RAN node is too good true for a legitimate RAN node) or if the received coverage level satisfies a predefined difference percentage with respect to a second-best RAN node available to the idle mode user equipment or with respect to a reference coverage level value included in the fake base station barring configuration. Accordingly, if a received coverage level of a current to-be-selected RAN node is too good to be true (e.g., too high, compared to the detected coverage levels of second/third/other RAN nodes), it is likely an FBS (e.g., has a different radio condition profile than a legitimate RAN node).

In another embodiment, either complementary or alternatively to the FBS cell selection/re-selection barring configuration that may be transmitted in a fake base station barring configuration, a legitimate RAN node may configure user equipment devices with an FBS access barring condition set/criterion set (e.g., different from the FBS selection/re-selection criteria). The access barring condition set/criterion set may be included in the same fake base station barring configuration as the FBS cell selection/re-selection barring configuration, or in a separate configuration. An access barring condition set/criterion set may comprise cell access barring conditions usable when attempting to establish a communication session with a particular/targeted RAN node, for example via RRC message signals (e.g., not selection/re-selection), which upon the access barring criterion being satisfied, an idle mode user equipment may halt attempting to connect with the targeted RAN node and may flush received access configuration information corresponding to the current/targeted RAN node. Such variety of FBS barring configurations may be beneficial due to a legitimate RAN node having differing levels of information related to active fake base stations. For example, a legitimate RAN node may have information associated with a fake base station's radio conditions pertinent to node selection or re-selection but may not have information associated with conditions pertinent to node access. In another scenario, a legitimate RAN may have information associated with radio conditions that correspond to a likelihood of a targeted to-be-connected node being an active fake base station, which information may comprise, for example, a received timing advance measurement report generated by an idle mode user equipment, corresponding to a signal received from a FBS (e.g., a nearby FBS would generate high power but reduced timing advance compared to a legitimate RAN node. Thus, an idle mode user equipment device may determine whether configured FBS selection/re-selection barring conditions are satisfied with respect to a signal received from a RAN node to which the user equipment is about to select-re-select. If an idle mode user equipment is configured with FBS access barring configuration information, the user equipment may determine whether criterion/criteria contained in the access barring configuration is satisfied by a signal, or characteristics corresponding thereto, received from a targeted RAN node with which the user equipment seeks to establish a communication session, and if so the user equipment may consider the targeted RAN node as being a FBS and may halt node access, flush access confirmation information received from the targeted node, and attempt accessing an available second-best RAN node. Accordingly, using embodiments disclosed herein, a legitimate RAN node may become able to dynamically protect idle mode user equipment devices from selecting/re-selecting or accessing an active FBS.

Using conventional techniques, a RAN node may transmit barring configurations towards user equipment to be used thereby to avoid accessing the RAN node, which may be useful during periods of node congestion wherein the node cannot accept new connections, and so, temporally, the node bars access to itself. Using embodiments disclosed herein, a legitimate RAN node/cell may determine and broadcast selection/re-selection barring criteria or access barring criteria corresponding to another cell/node that is believed to be an active FBS. Thus, according to embodiments disclosed herein a cell/node may bar access to another node. Embodiments disclosed herein may implement novel user equipment behavior, wherein a user equipment may use multiple sets of selection/re-selection/access barring conditions/criteria, sent from a legitimate RAN node to bar access to other nodes that may be active FBS nodes. Thus, an idle mode user equipment device may, unlike with conventional techniques wherein a set of radio conditions are configured and which upon being satisfied a RAN node is selected/re-selected or accessed, check satisfaction of configured FBS barring configuration criteria with respect to signals received from a targeted node to be selected or accessed. If the criterion/criteria are satisfied, the targeted RAN node may be effectively and dynamically barred from selection/re-selection or access. In an embodiment, barring configuration information may be contained in information elements, which may be included in a SIB1 signal message.

Figure 2:
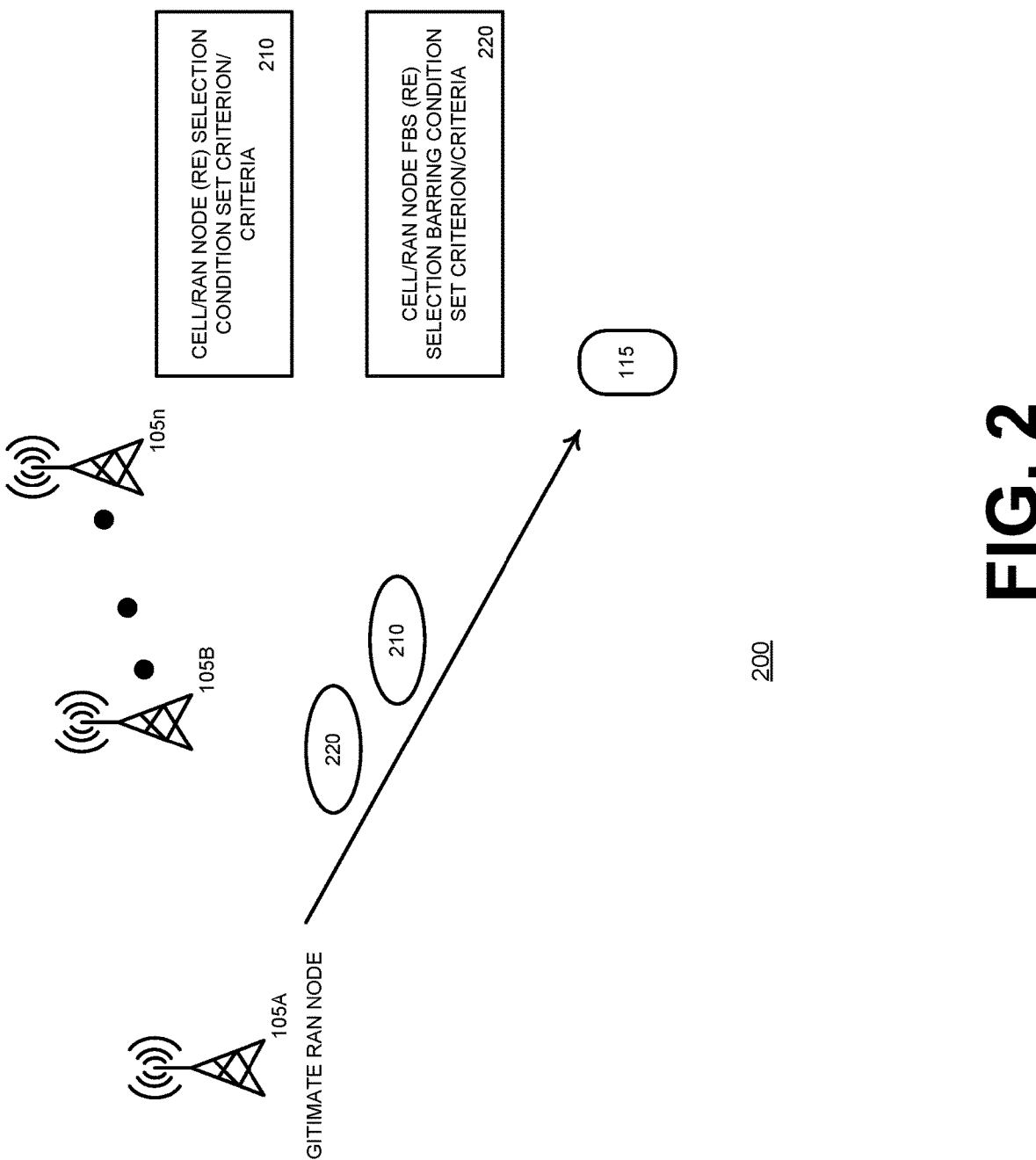
FIG. 2 illustrates an environment wherein a user equipment is configured with node selection criteria and fake base station selection barring criteria.

Turning now to FIG. 2, legitimate RAN node 105A broadcasts, as part of the SIB signaling for example, a conventional coverage condition set 210, which may be referred to as a coverage criterion, usable by user equipment 115 to perform idle mode cell selection or cell re-selection. RAN node 105A also may transmit a FBS cell selection/re-selection barring conditions configuration 220, which may be referred to as a fake base station barring configuration. Thus, at idle mode user equipment 115, when moving among RAN nodes 105A-105n, any of which could be a FBS, the user equipment may first determine whether the conventional cell selection/re-selection coverage conditions contained in configuration 210 are satisfied. If the conventional coverage criterion/criteria is/are satisfied, the RAN node that broadcast a signal that had characteristics, such as signal strength, that satisfied conventional coverage criterion/criteria 210 may be selected, or re-selected, for camping.

However, on condition of FBS barring configuration 220 being configured into user equipment 115, the idle mode device may check, or determine, before selecting or re-selecting a targeted RAN node according to conventional criterion contained in configuration 210) (e.g., before determining, or selecting/reselecting a RAN node of RAN nodes 105A-n having a strongest signal strength) whether criterion/criteria contained in fake base station barring configuration 220 is/are satisfied by one or more signals, or signal characteristics corresponding thereto, broadcast by the target RAN node. Upon satisfaction of criterion/criteria contained in fake base station barring configuration 220, idle mode user equipment device 115 may determine that the targeted RAN node is barred from cell selection or re-selection, regardless of whether the targeted RAN node satisfies a minimum coverage condition/criterion, or strongest signal strength criterion, contained in a conventional cell selection or re-selection condition set contained in configuration 210.

Figure 3:
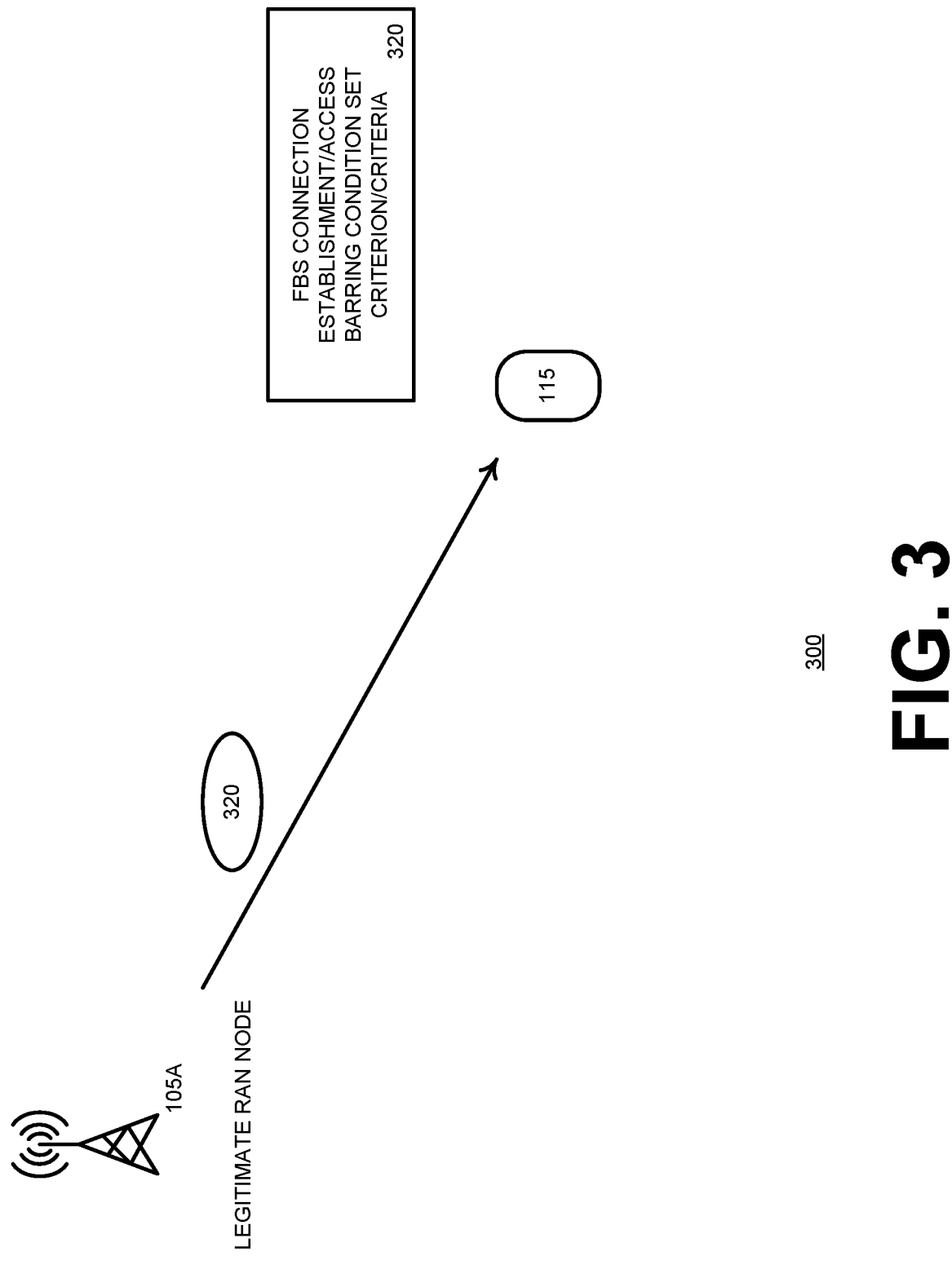
FIG. 3 illustrates an environment wherein a user equipment is configured with fake base station access barring criteria.

Turning now to FIG. 3, the figure illustrates a legitimate RAN node 105A. RAN node 105A may, alternatively or complementarily to the FBS cell selection/re-selection barring condition set configuration 220 (shown in FIG. 2), broadcast a FBS access barring condition set/criterion configuration 320. In an embodiment, configurations 220 and 320 may be transmitted separately from RAN node 105A to UE 115. In an embodiment, configuration information corresponding to configurations 220 and 320 may be transmitted simultaneously, or may be transmitted together, from RAN node 105A to UE 115, and may collectively be referred to as a fake base station barring configuration. Configuration information corresponding to configuration 220 shown in FIG. 2 may comprise information usable by user equipment 115 to select, reselect, or camp on, a radio access network node, for example radio access network node 105A. Configuration information corresponding to configuration 320 shown in FIG. 3 may comprise information usable by user equipment 115 to initiate a connection with, or establish a connection with, for example via radio resource control message signaling, a radio access network node, for example radio access network node 105A. Thus, when configured with information contained in configuration 320, idle mode user equipment 115, while attempting to access a RAN node (e.g., while UE 115 attempts connection establishment procedures with RAN node 105A), may determine whether FBS access criterion/criterion contained in FBA barring configuration 320 is/are satisfied. If conditions/criterion/ criteria contained in configuration 320 are satisfied, idle mode user equipment device 115 may determine whether a to-be-accessed RAN node, which may be referred to a targeted RAN node, is an active FBS. If analysis of a signal, or information contained in a signal, broadcast from a targeted RAN node satisfies criterion/criteria contained in configuration 320, UE 115 may halt connection establishment actions/procedures, flush received radio resource control configuration messages (which are likely to comprise spam/spyware/executable malware messages). After halting or avoiding connection with a targeted RAN node that user equipment 115 has determined is likely an FBS, based on evaluation of information contained in message signals broadcast by the targeted RAN node, the user equipment may attempt to access a second-best available RAN node, which may be referred to as a new targeted RAN node, based on the new targeted RAN node corresponding to a second best, or second-strongest signal strength. It will be appreciated that due to the nature of fake base stations, for example being mounted to or located within a vehicle, a signal strength corresponding to a fake base station may correspond to a strongest signal strength determined by a user equipment, which may also be located in or correspond to a vehicle and which may be attempting to connect to a radio access network node, and a second strongest signal strength, as determined by the user equipment, may correspond to a legitimate radio access network node and may be a strongest signal strength among legitimate radio access network nodes to which the user equipment could potentially connect.

Turning now to FIG. 4, the figure illustrates an example fake base station barring configuration 400. Configuration 400 may comprise FBS selection/re-selection criterion/criteria 420, such as information that may be included in configuration 220 described in reference to FIG. 2. Configuration 400 may comprise access barring criterion/criteria 430 such as information that may be included in configuration 320 described in reference to FIG. 3. Configuration 400 may comprise local or global cell identifier field 422 that may include one or more identifiers corresponding to one or more respective cells/RAN nodes that may have been identified as active fake base stations. Configuration 400 may comprise received coverage maximum threshold field 424 in criteria 420 that may include a maximum signal strength value. For example, if a user equipment receives a signal from a targeted RAN node and the user equipment determines that the received signal has a signal strength greater than a value configured in field 424, the user equipment may determine that the signal strength is 'too good to be true' (e.g., too strong to have been broadcast from a legitimate RAN node transmitter) and thus corresponds to a fake base station. Configuration 400 may comprise difference percentage field 426 in criteria 420. A value in field 426 may comprise a value corresponding to a difference, or a percent difference, between a received coverage (e.g., a signal strength corresponding to a targeted RAN node) and a defined coverage level. A value in field 426 may comprise a value corresponding to a difference, or a percent difference, between a received coverage (e.g., a signal strength) corresponding to a targeted RAN node and a coverage level corresponding to a second-best RAN node. A value in field 426 may comprise a value corresponding to a difference, or a percent difference, between a received coverage level associated with a targeted RAN node and an average received coverage level corresponding to the next one or more best available RAN nodes. If a user equipment determines that a signal strength corresponding to a signal broadcast from a targeted radio access network node exceeds a defined coverage level, a determined coverage level corresponding to a second best node, or a determined average received coverage level of one or more next best nodes, by analyzing a signal strength corresponding to the targeted node with respect to a value in field 426, the user equipment may determine that the targeted node is a fake base station and may avoid selecting, reselecting, or camping on the targeted note.

Configuration 400 may comprise received timing advance ("TA") minimum threshold field 432 in criteria 430. Field 432 may comprise a minimum timing advance value. If a user equipment attempting to connect to a targeted radio access network node determines that a timing advance corresponding to the targeted node is less than a value configured in field 432, the user equipment may determine that the targeted node is a fake base station and may avoid connecting to, or may avoid initiating connection to, the targeted node. Configuration 400 may comprise received timing advance difference percentage field 434 in criteria 430. Field 434 may comprise a maximum percent difference value corresponding to a percent difference between a timing advance determined bonding to a targeted node and a defined timing advance. For example, if a user equipment attempting to connect with a targeted node determines that a percent difference between timing advance corresponding to the targeted node and a defined timing advance value is greater than a value configured in field 434, the user equipment may determine that the target node is a fake base station and may avoid, or terminate, attempting to connect with the targeted node. Criteria 430 may comprise criteria related to radio aspects other than timing advance or signal strength, for example signal noise floor values.

Figure 5:
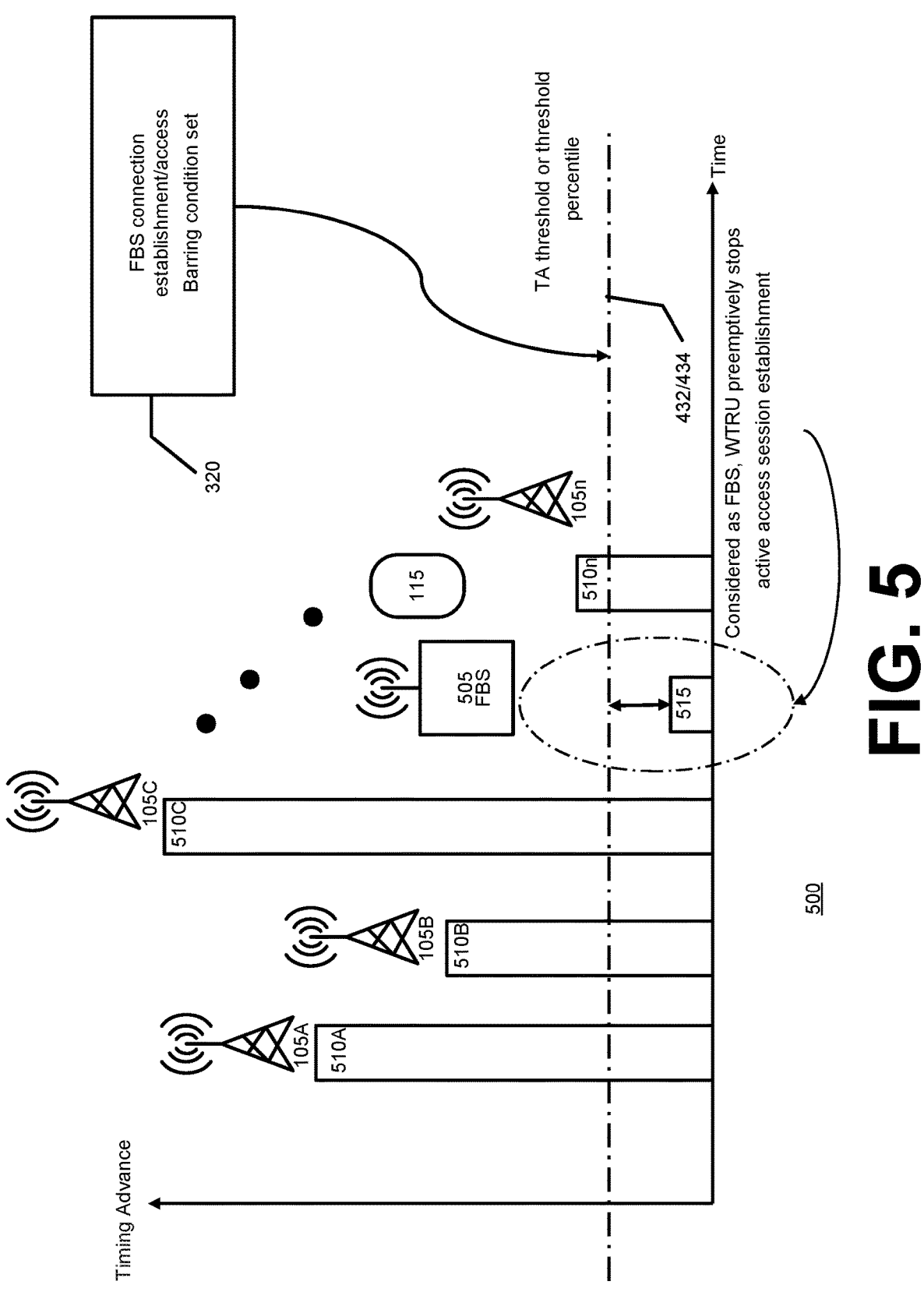
FIG. 5 illustrates an example determining of a fake base station and avoiding establishing a connection therewith.

FIG. 5 illustrates an example dynamic FBS access barring procedure, where an idle mode user equipment 115 is dynamically configured, by broadcast SIB and/or paging signaling, to bar access to RAN nodes that broadcast signals that satisfy a configured received timing advance level criterion, for example, a timing advance corresponding to a targeted RAN node 505 that is below a configured timing advance reference level, or criterion, such as value threshold 432 or difference threshold 434. Threshold 432 or 434 may be determined based on a minimum timing advance value that would correspond to a legitimate RAN node being selected by a user equipment. Even if a user equipment in a vehicle is located ten feet from the base of a tower that corresponds to a legitimate RAN node antenna, a timing advance corresponding to the user equipment with respect to the RAN node will be longer than if the UE is ten feet away from a FBS that is also in a vehicle at the same elevation as the UE. Thus, in an embodiment, a timing advance threshold criterion configured in a user equipment may be determined such that if a timing advance corresponding to a targeted RAN node is smaller than the configured timing advance criterion, the user equipment may determine that the targeted RAN node is a FBS and may avoid accessing, or connection establishment, with the targeted RAN node. In another embodiment, a timing advance threshold criterion configured in a user equipment may be determined such that if a timing advance corresponding to a targeted RAN node differs substantially (e.g., more than a configured threshold, which may be a percentage value) from timing advance values that correspond to multiple RAN nodes having coverage areas within which a user equipment can potentially select, the user equipment may determine that the targeted RAN node is a FBS and may avoid accessing, or connection establishment, with the targeted RAN node.

Because a user equipment, operating in an idle mode or standby mode, may not become aware of a received timing advance level corresponding to a RAN node until the user equipment begins a connection establishment procedure with a targeted RAN node of interest, the idle mode user equipment may proceed with initial connection establishment with a targeted selected RAN node before having determined that node 505 is likely a fake base station. Upon receiving a measured timing advance level from a targeted, to-be-accessed RAN node, a user equipment may compare a received timing advance with respect to a configured FBS access barring TA threshold. Upon the received timing advance satisfying the criterion/threshold, the idle mode user equipment device may interrupt an ongoing connection establishment with the targeted RAN node, flush RRC configurations (e.g., an RRCreconfig message(s)), and re-attempt connection establishment with an available next best RAN node (e.g., a RAN node having a next best signal strength as compared to a signal strength corresponding to the node determined to be a fake base station).

In the example shown in FIG. 5, timing advance values 505A, 505B, 505C, and 505n may correspond to distances between user equipment 115 and different respective legitimate RAN nodes 105A-105n. Threshold 432 or 434 may be a determined value that corresponds to a smallest timing advance value that could be associated with a RAN node 105A-105n to which user equipment 115 is closest, which in the figure appears to be RAN node 105n. Timing advance value 515 received from FBS 505 is below threshold 432/434. Thus, even if UE 115 may have selected, reselected, or camped on FBS 505 and targeted the fake base station for connection establishment due to a signal strength value corresponding to FBS 505 being higher than respective signal strengths corresponding to nodes 105A-105n, the user equipment may determine that FBS 505 is a fake base station and avoid connection establishment therewith based on timing advance value 515 being lower than threshold 432/434. A timing advance, or time advance, value may be in terms of time or may be in terms of a number of slots, symbols, subframes, even frames.

Since a fake base station barring configurations may be dynamically delivered to an idle user equipment device via a broadcast information block message signal, a fake base station configuration may be receivable by a fake base station. An active FBS may attempt overriding or disabling a configured FBS barring condition/criterion such that an idle mode user equipment is no longer configured to avoid connecting to the fake base station. Thus, it is desirable that an idle mode user equipment device have a means to verify that configuration 220 or 320 is/are received from a legitimate RAN node.

Figure 6:
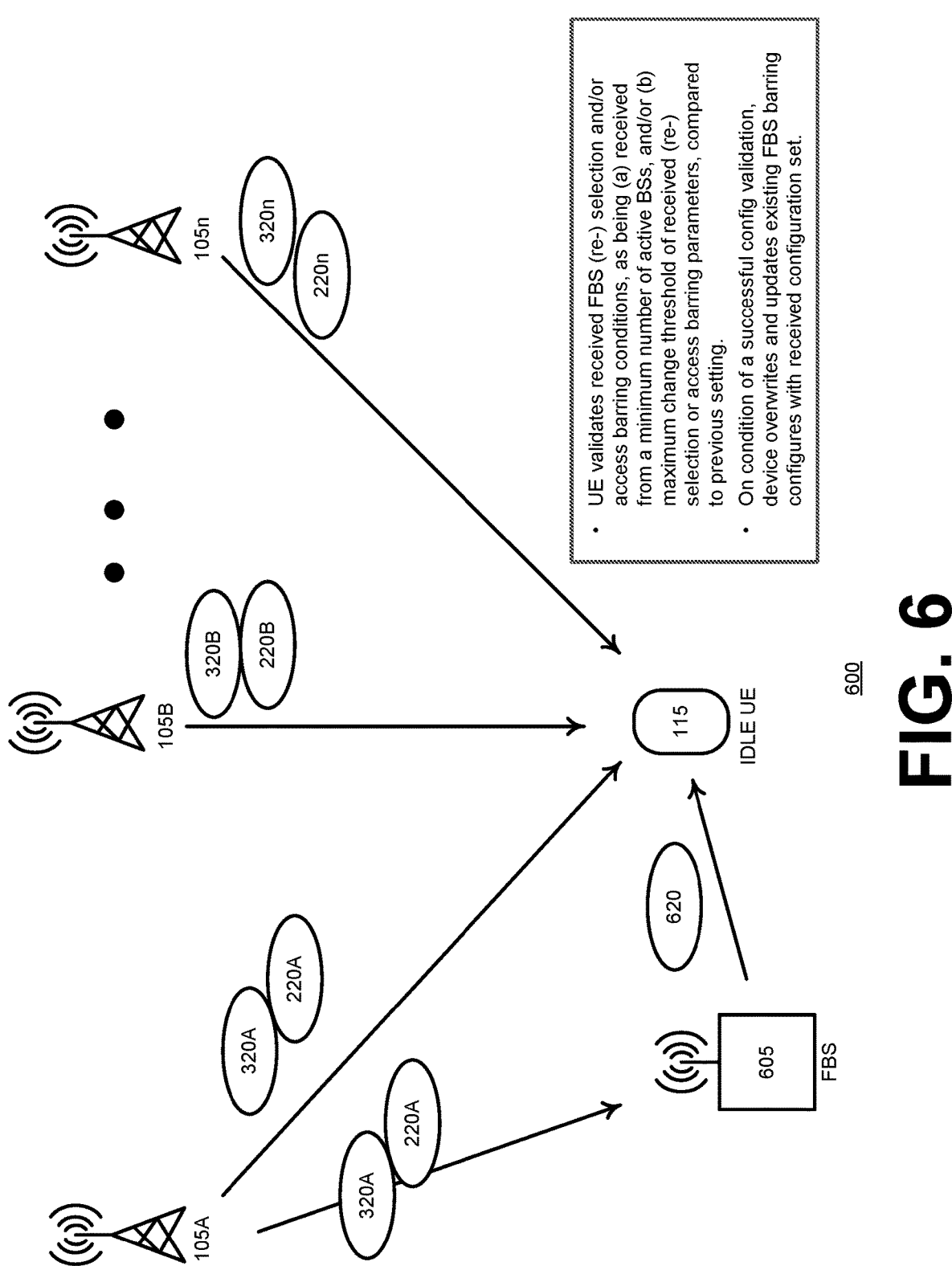
FIG. 6 illustrates an example determining that a fake base station barring configuration is a legitimate fake base station barring configuration.

An idle user equipment may receive a fake base station barring configuration as part of an RRC connection termination configuration received when the idle mode user equipment was last connected to a legitimate RAN node, with respect to which a conventional authentication has already occurred. As shown in FIG. 6, user equipment 115 may receive fake base station barring configurations 220A/320A-220n/320n as broadcast information (e.g., as part of SIB or paging information) from a configured minimum number of RAN nodes 105A-105n. Idle mode user equipment device 115 may not update or override a previously-received fake base station barring configuration unless the user equipment receives the same FBS barring information 220/320 from a minimum number of RAN nodes 105A-105n. Accordingly, neighboring legitimate RAN nodes 105A-105n may coordinate with each other with respect to FBS barring configuration 220/320. Upon determining that the same fake base station barring configuration 220/320 has been received from a configured minimum number of legitimate RAN nodes 105A-105n, user equipment 115 may disregard a fake base station barring configuration previously received, which may have been received from a legitimate RAN node, or the fake base station barring configuration may have been a fake, or illegitimate fake base station barring configuration received from fake base station 605.

In an embodiment, a barring configuration information element may be contained in an SIB1 message. A barring configuration information element may be placed in other RRC messages. Such indication can be used either to indicate to idle mode user equipment devices that another SIB may be scheduled to carry a barring configuration or to enable user equipment to override conventional selection/reselection configuration when barring configuration criterion/criteria is satisfied. In an embodiment, a barring configuration may comprise a minimum and maximum (e.g., a range) of a barring parameter metric (e.g., a range of coverage level values or timing advance values). In case a signal corresponding to a radio access network node cell violates such a barring range, a user equipment applying the criterion/range may consider the node as a FBS and may bar the FBS from selection or camping.

Figure 7:
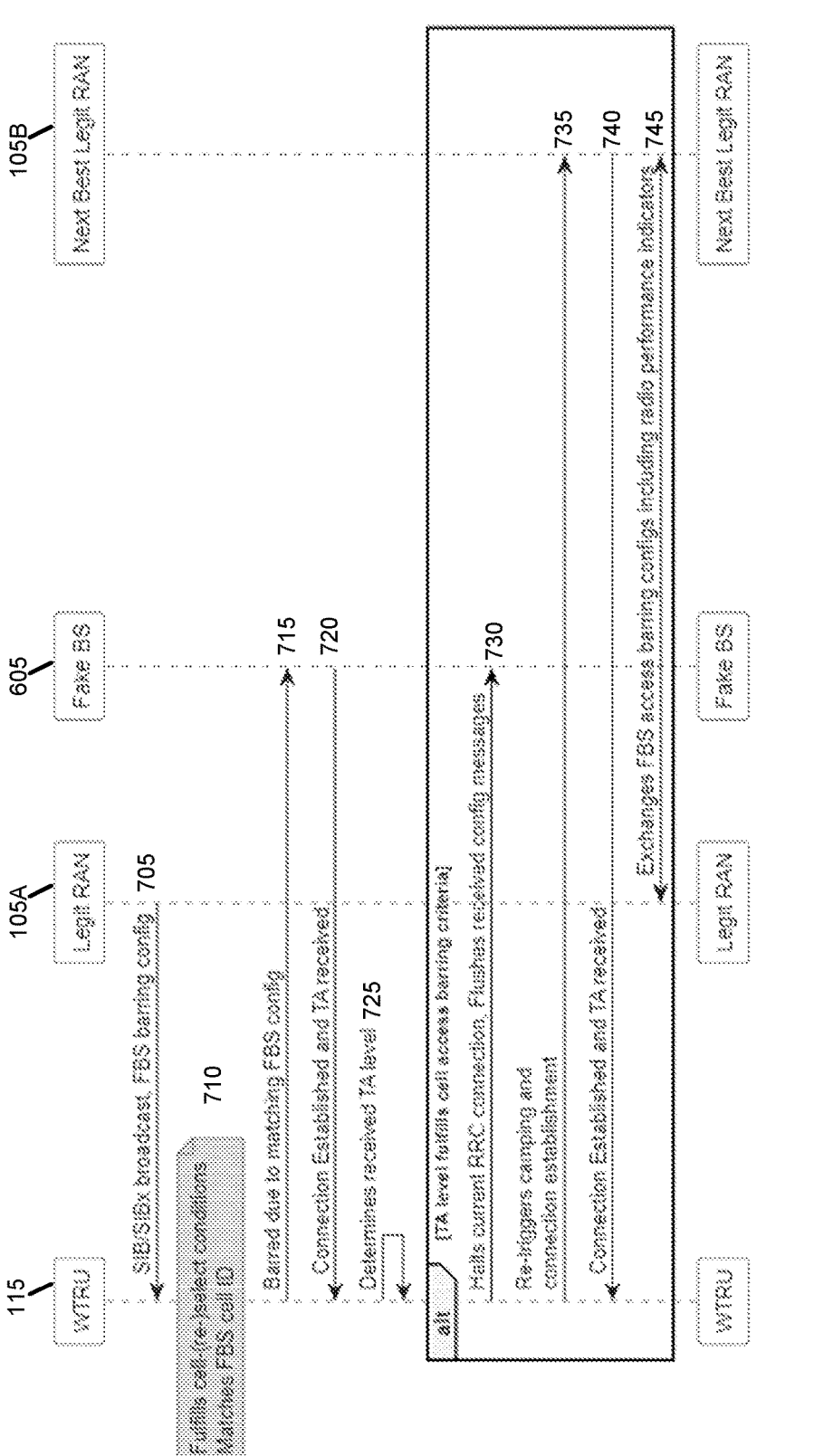
FIG. 7 illustrates a timing diagram of an example fake base station barring procedure.

Turning now to FIG. 7, the figure illustrates an overall device action flow 700 of dynamic FBS barring. At act 705, legitimate radio access network node 705 may broadcast a fake base station barring configuration via a system information block message signal. At act 710, user equipment 115 may determine whether a signal received from base station 605 satisfies conditions, or criteria, specified in the configuration received at act 705. For example, if a signal received from base station 605 comprises an identifier that is included in configuration information received at act 705, user equipment 115 may bar selection, or reselection, of base station 605 at act 715.

In another embodiment, if signal characteristics corresponding to a signal received from base station 605 satisfies criteria contained in fake base station barring configuration information received at act 705, user equipment 115 may bar selection of, reselection of, or access to base station 605 at act 715. In an embodiment, user equipment 115 may have selected, or reselected, base station 605 and may receive a timing advance value, during RRC connection establishment procedures, from base station 605 at act 720. User equipment 115 may determine at act 725 that the timing advance value received at act 720 satisfies an access barring criterion. At act 730, user equipment 115 may halt RRC connection establishment with base station 605 and flush received RRC configuration messages. Act 735, user equipment 115 may camp on, or initiate connection establishment with, a next-best legitimate RAN node 105B, which may be 'next-best' in the sense that a signal strength corresponding to RAN node 105B is not as strong as a signal strength corresponding to base station 605. At act 740, user equipment 115 may receive a timing advance value from legitimate RAN node 105B, may determine that radio access network node 105B is a legitimate radio access network node, and establish a connection with radio access network node 105B. Legitimate radio access network nodes 105A and 105B may exchange information at act 745 that may be used by either of the radio access network nodes to update fake base station barring configuration information, which may be transmitted to user equipment devices as fake base station barring configurations. It will be appreciated that a fake base station barring configuration transmitted by radio access network node 105A at act 705 may comprise fake base station selection/reselection/access barring information that may have been updated, using, for example, an AI/ML model, based on information corresponding to previous connection attempts by one or more user equipment to fake base station 605.

Figure 8:
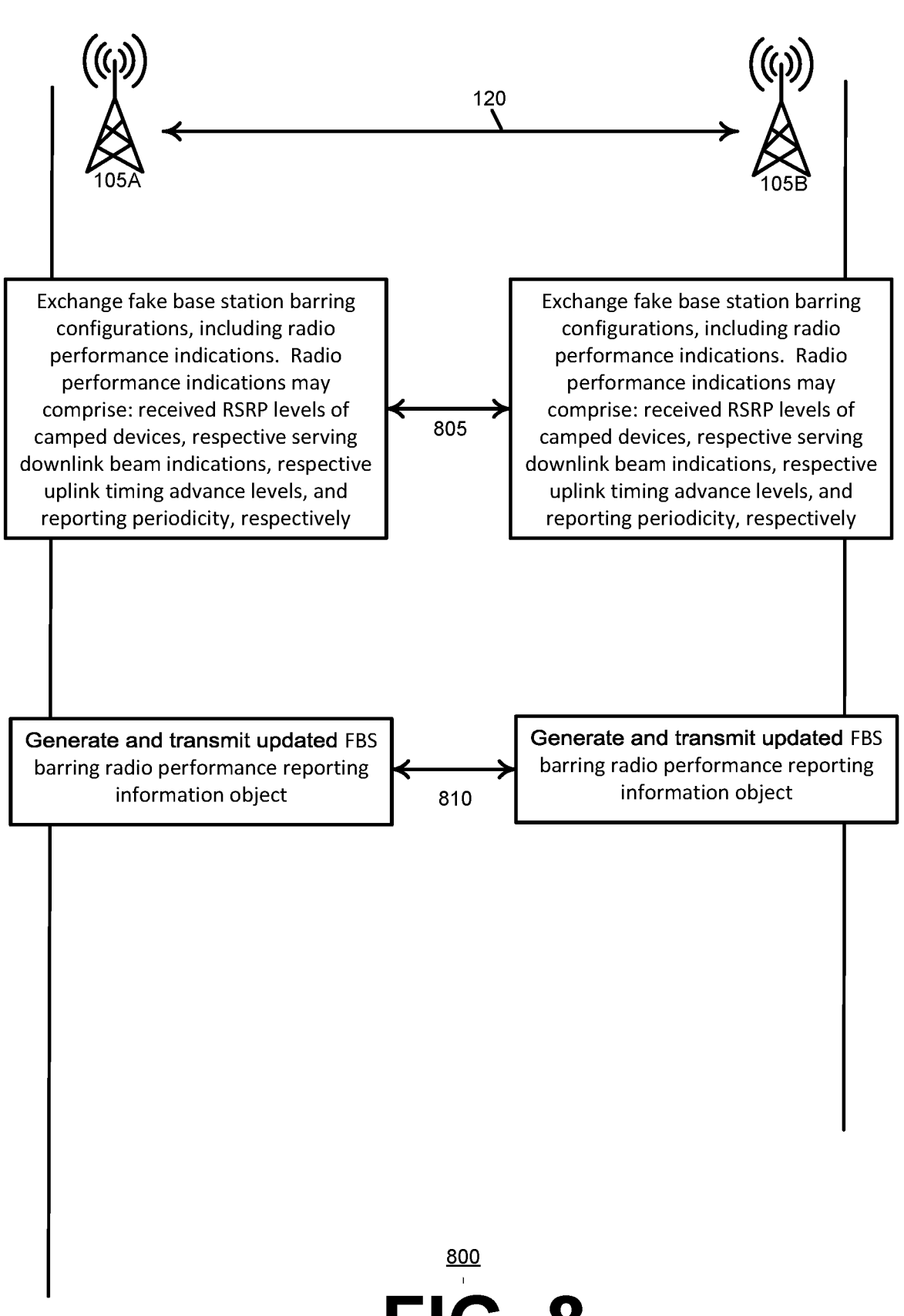
FIG. 8 illustrates a timing diagram of an example method to share and update barring criteria and information between radio access network nodes.

Turning now to FIG. 8, the figure illustrates a timing diagram of an example method to 800 facilitate barring communication by an idle user equipment with a fake base station. At act 805, RAN nodes 105A and 105B may exchange, via backhaul links (XN/F1 interfaces), fake base station (FBS) access barring configurations, including radio performance indications. Radio performance indications may comprise received RSRP levels of camped devices, respective serving downlink beam indications, respective uplink timing advance levels, and a reporting periodicity. At act 810, on condition of expiration of the reporting periodicity, the RAN nodes may generate an updated FBS barring radio performance reporting information objects and transmit the updated FBS barring radio performance reporting information objects via backhaul links towards adjacent RAN nodes in a configured neighbor list. The RAN nodes may use AI/ML to generate the updated FBS barring radio performance reporting information objects based on radio performance indications received at act 805.

Figure 9:
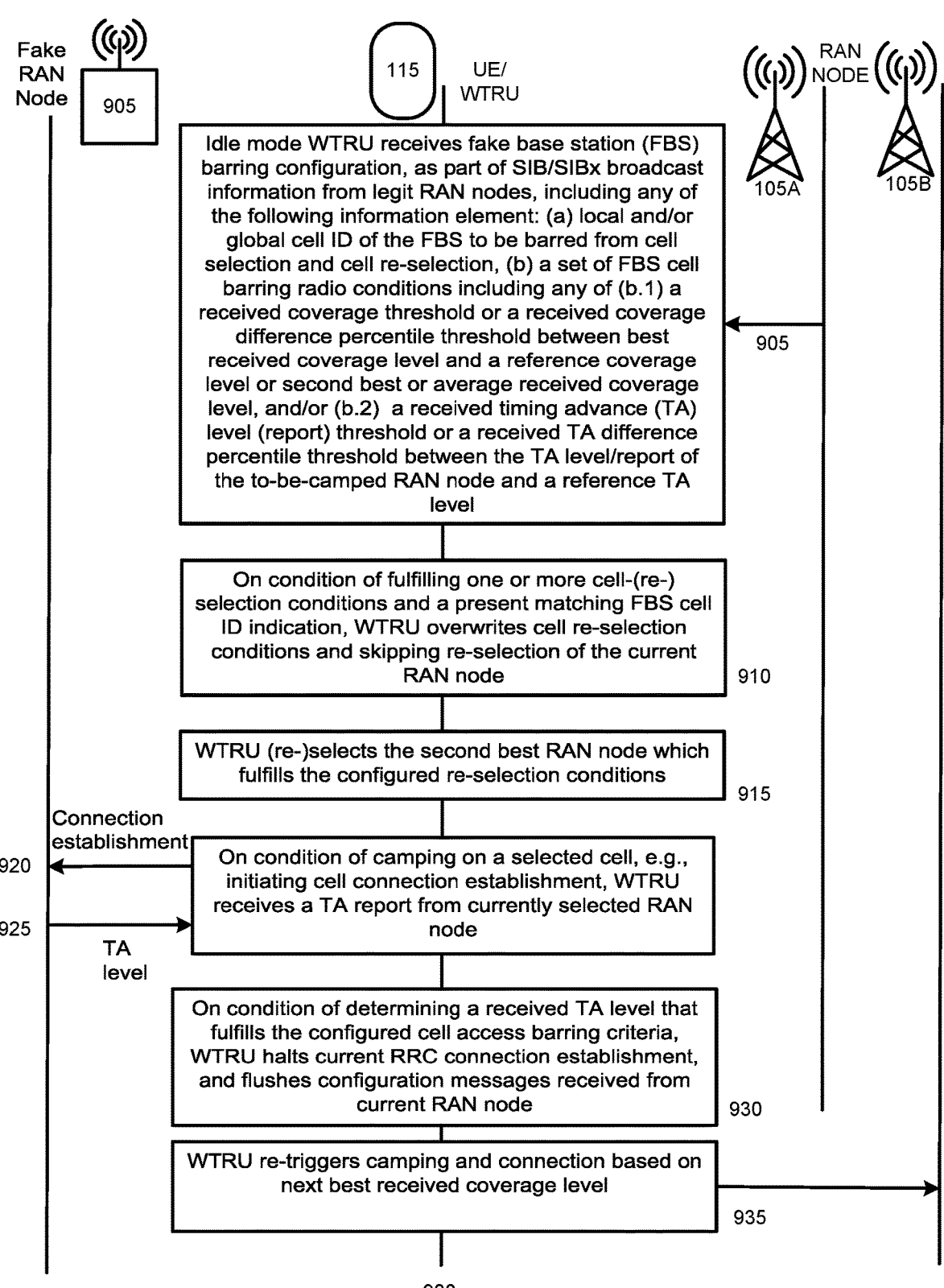
FIG. 9 illustrates a timing diagram of an example method to bar operation with a fake base station.

Turning now to FIG. 9, the figure illustrates a timing diagram of an example method 900 to bar communication by an idle user equipment with a fake base station. At act 905, user equipment 115 may receive from RAN node 105A a fake base station barring configuration, such as, for example, configuration 220 or 320 as described in reference to FIG. 2. The configuration received at act 905 may comprise selection barring criterion/criteria, excess barring criterion/criteria, or both. The configuration received at act 905 may be part of SIB/SIBx broadcast information transmitted by one or more legitimate RAN nodes, and may comprise information elements, such as a local or global cell identifier corresponding to a FBS to be barred from cell selection and cell re-selection. The configuration received at act 905 may comprise a set of FBS cell barring radio conditions/criterion, which may include a received coverage threshold, a received coverage difference percentile threshold between a best received coverage level and a reference coverage level or second best or average received coverage level, or a received timing advance level (e.g., a value reported by a targeted RAN node) threshold or a TA difference/percentage threshold to be used to analyze a TA level reported by a to-be-camped RAN node with respect to a reference TA level.

At act 910, on condition of satisfying one or more node (re)selection condition/criteria, which may comprise a base station identifier corresponding to a targeted node matching a fake base station identifier indicated in configuration information received at act 705, UE/WTRU 115 may overwrite cell re-selection conditions and may skip re-selection of a currently targeted node 905. At act 915, UE/WTRU 115 may (re)select a second-best, or next-best, RAN node, which may be RAN node 105B, that satisfies configured re-selection conditions (which may be conventional reselection criteria/conditions).

In an embodiment, on condition of camping on a selected cell/node, (e.g., initiating cell connection establishment), for example node 905, at act 920 UE/WTRU 115 may receive a TA report from currently selected node 905 at act 925. On condition of determining that a TA level received at act 925 satisfies cell access barring criteria received at act 705, UE/WTRU 115 may at act 930 halt current RRC connection establishment and flush received configuration messages from current node 905. At act 935, UE/WTRU 115 may trigger camping and connection establishment with next best RAN node 105B based on a next-best received coverage level/next-best signal strength (e.g., a signal strength corresponding to RAN 105B is next-best compared to a signal strength corresponding to fake base station 905.

Figure 10:
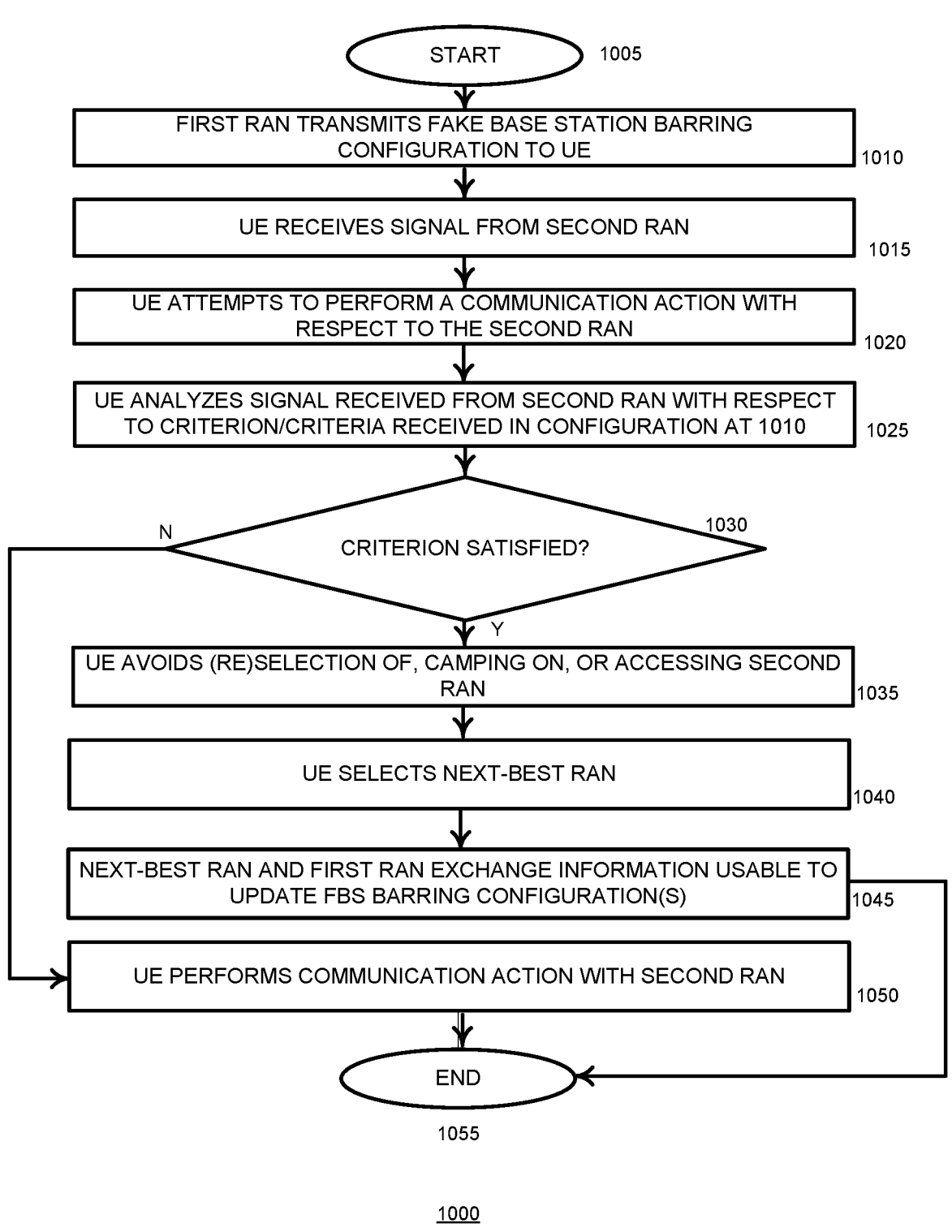
FIG. 10 illustrates a flow diagram of an example method to determine that a node is a fake base station and to operate with a different node.

Turning now to FIG. 10, the figure illustrates a flow diagram of an example method to bar communication by an idle user equipment with a fake base station. Method 1000 begins at act 1005. At act 1010, a first radio access network node may transmit to a user equipment a fake base station barring configuration. The fake base station barring configuration may comprise configuration information, for example, information contained in configuration 220 described in reference to FIG. 2 or configuration 320 described in reference to FIG. 3. At act 1015, the user equipment may receive a signal from a second radio access network node. At act 1020, the user equipment may attempt to perform a communication action with respect to the second radio access network node, for example the user equipment may attempt to select or access the second radio access network node. At act 1025, the user equipment may analyze the signal received at act 1015 with respect to a criterion, or criteria, contained in the configuration received from the radio access network node at act 1010. For example, the user equipment may analyze an identifier contained in the signal received at act 1015, a signal strength corresponding to the signal received at act 1015, or a timing advance value corresponding to the signal received at act 1015 with respect to a criterion, or criteria, contained in the configuration received at act 1010. The user equipment may analyze at act 1025 whether a node has become available recently, for example within a configured presence criterion period before the performing of act 1025. If the user equipment determines at act 1030 that the analysis performed at act 1025 does not satisfy barring criteria contained in the criterion configuration received at act 1010, the user equipment may perform a communication action with respect to the second radio access network node at act 105, for example the user equipment may select or access the second radio access network node, and method 1000 may advance to act 1055 and end.

Returning to description of act 1030, if the user equipment determines that analysis performed at act 1025 satisfies barring criterion, or criteria, contained in barring configuration information received at act 1010, method 1000 may advance to act 1035. At act 1035, the user equipment may perform a communication action with respect to the second radio access network node, for example the user equipment may avoid selecting or avoid accessing the second radio access network node. At act 1040, the user equipment may select the next best radio access network node, for example a radio access network node having a signal corresponding to a signal strength that is a next highest signal strength as compared to a signal strength that corresponded to the second radio access network node. The user equipment may select or access the next best radio access network node at act 1040.

At act 1045, the next best radio access network node and the first radio access network node may exchange information corresponding to the avoiding, by the user equipment, of selecting or accessing the second radio access network node. The next best radio access network node and the first radio access network node may update fake base station barring configuration information, for example using a machine learning model, to be transmitted to user equipment in future transmissions of fake base station barring configurations. Method 1000 advances to act 1055 and ends.

Turning now to FIG. 11, the figure illustrates an example embodiment method 1100 comprising at block 1105 receiving, by a user equipment comprising a processor from a first radio access network node, a fake base station barring configuration comprising at least one barring criterion; at act 1110 receiving, by the user equipment from a second radio access network node, a signal; at act 1115 analyzing, by the user equipment, the signal with respect to the at least one barring criterion to result in an analyzed signal; and at act 1120 based on the analyzed signal being determined to satisfy the at least one barring criterion, facilitating, by the user equipment with respect to the second radio access network node, performance of a communication action.

Turning now to FIG. 12, the figure illustrates a user equipment 1200, comprising at block 1205 a processor configured to select a first radio access network node according to a configured selection criterion; at block 1210 receive, from the first radio access network node, a fake base station barring configuration comprising at least one barring criterion; at block 1215 determine a second radio access network node to be selected according to the configured selection criterion; at block 1220 analyze at least one measured parameter value, corresponding to the second radio access network node, with respect to the at least one barring criterion to result in at least one analyzed measured parameter value; at block 1225 based on the at least one analyzed measured parameter value, perform a communication action; at block 1230 determine that the at least one analyzed measured parameter value satisfies the at least one barring criterion; and at block 1235 wherein the communication action comprises avoiding selecting the second radio access network node based on the at least one analyzed measured parameter value being determined to satisfy the at least one barring criterion.

Turning now to FIG. 13, the figure illustrates a non-transitory machine-readable medium 1300 comprising at block 1305 executable instructions that, when executed by a processor of a user equipment, facilitate performance of operations, comprising receiving, from a first radio access network node, a fake base station barring configuration comprising at least one barring criterion; at block 1310 receiving, from a second radio access network node, a broadcast signal; at block 1315 analyzing, at least one signal characteristic corresponding to the broadcast signal with respect to the at least one barring criterion to result in an analyzed signal characteristic; and at block 1320 in response to the analyzed signal characteristic being determined to satisfy the at least one barring criterion, initiating, with respect to the second radio access network node, a communication action.

Figure 14:
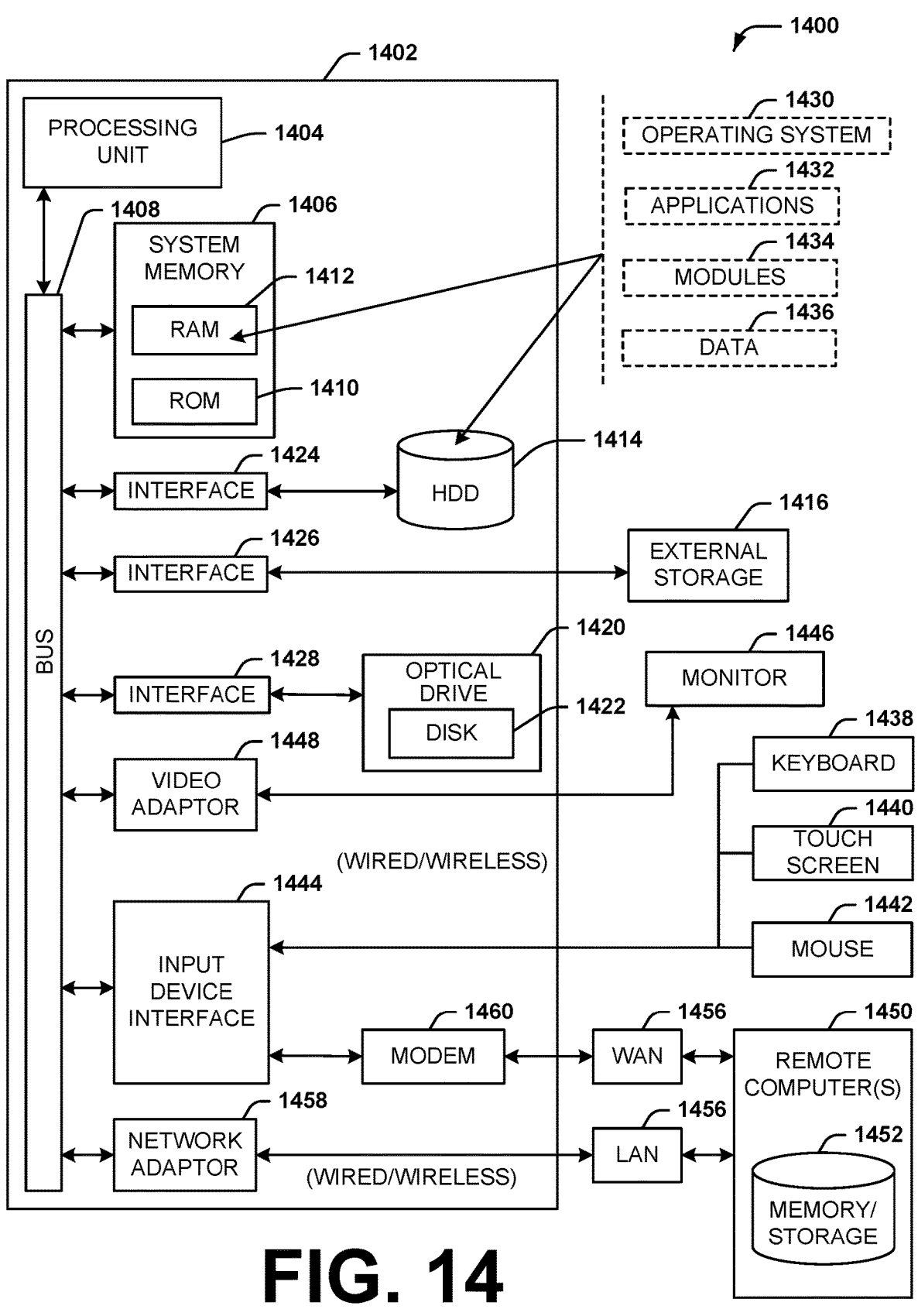
FIG. 14 illustrates an example computer environment.

In order to provide additional context for various embodiments described herein, FIG. 14 and the following discussion are intended to provide a brief, general description of a suitable computing environment 1400 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors and may include a cache memory. Dual micro-processors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

Computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid-state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can option-ally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can comprise a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/ storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 15:
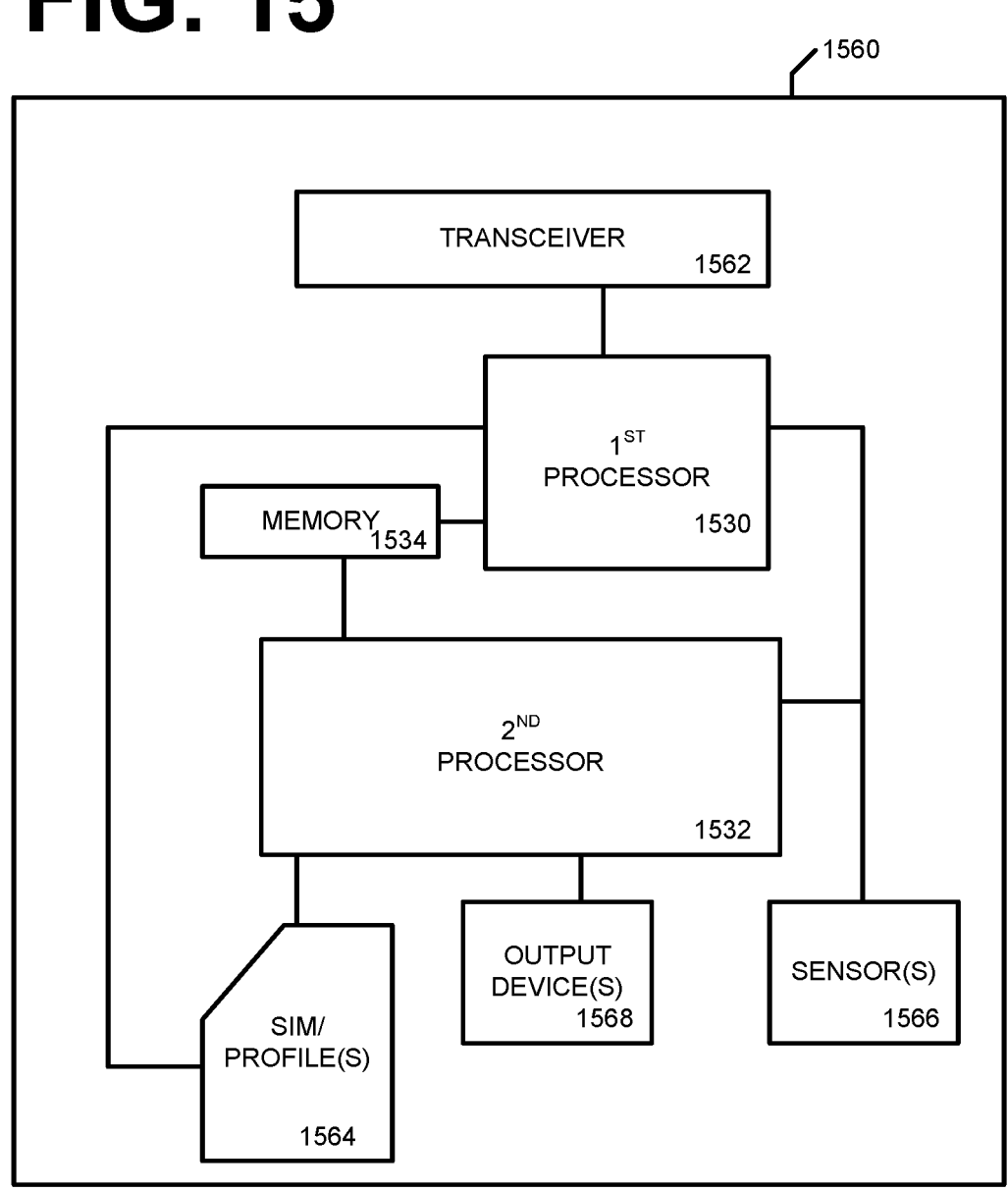
FIG. 15 illustrates a block diagram of an example wireless user equipment.

Turning to FIG. 15, the figure illustrates a block diagram of an example UE 1560. UE 1560 may comprise a smart phone, a wireless tablet, a laptop computer with wireless capability, a wearable device, a machine device that may facilitate vehicle telematics, a tracking device, remote sensing devices, and the like. UE 1560 comprises a first processor 1530, a second processor 1532, and a shared memory 1534. UE 1560 includes radio front end circuitry 1562, which may be referred to herein as a transceiver, but is understood to typically include transceiver circuitry, separate filters, and separate antennas for facilitating transmission and receiving of signals over a wireless link, such as one or more wireless links 125, 135, and 137 shown in FIG. 1. Furthermore, transceiver 1562 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 15, UE 1560 may also include a SIM 1564, or a SIM profile, which may comprise information stored in a memory (memory 1534 or a separate memory portion), for facilitating wireless communication with RAN 105 or core network 130 shown in FIG. 1. FIG. 15 shows SIM 1564 as a single component in the shape of a conventional SIM card, but it will be appreciated that SIM 1564 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1564 and another device, which may be a component of RAN 105 or core network 130 shown in FIG. 1). A SIM profile 1564 may also comprise identifying information that is unique to the SIM, or SIM profile, such as, for example, an International Mobile Subscriber Identity ("IMSI") or information that may make up an IMSI.

SIM 1564 is shown coupled to both the first processor portion 1530 and the second processor portion 1532. Such an implementation may provide an advantage that first processor portion 1530 may not need to request or receive information or data from SIM 1564 that second processor 1532 may request, thus eliminating the use of the first processor acting as a 'go-between' when the second processor uses information from the SIM in performing its functions and in executing applications. First processor 1530, which may be a modem processor or a baseband processor, is shown smaller than processor 1532, which may be a more sophisticated application processor, to visually indicate the relative levels of sophistication (i.e., processing capability and performance) and corresponding relative levels of operating power consumption levels between the two processor portions. Keeping the second processor portion 1532 asleep/ inactive/in a low power state when UE 1560 does not need it for executing applications and processing data related to an application provides an advantage of reducing power consumption when the UE only needs to use the first processor portion 1530 while in listening mode for monitoring routine configured bearer management and mobility management/maintenance procedures, or for monitoring search spaces that the UE has been configured to monitor while the second processor portion remains inactive/asleep.

UE 1560 may also include sensors 1566, such as, for example, temperature sensors, accelerometers, gyroscopes, barometers, moisture sensors, and the like that may provide signals to the first processor 1530 or second processor 1532. Output devices 1568 may comprise, for example, one or more visual displays (e.g., computer monitors, VR appliances, and the like), acoustic transducers, such as speakers or microphones, vibration components, and the like. Output devices 1568 may comprise software that interfaces with output devices, for example, visual displays, speakers, microphones, touch sensation devices, smell or taste devices, and the like, which are external to UE 1560.

The following glossary of terms given in Table 1 may apply to one or more descriptions of embodiments disclosed herein.

TABLE 1

| Term | Definition |
|------|------------|
| UE | User equipment |
| WTRU | Wireless transmit receive unit |
| RAN | Radio access network |
| QoS | Quality of service |
| DRX | Discontinuous reception |

TABLE 1-continued

| Term | Definition |
|---|---|
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| AI | Artificial intelligence |
| ML | Machine learning |
| QCI | QoS Class Identifiers |
| BSR | Buffer status report |
| SBFD | Sub-band full duplex |
| CLI | Cross link interference |
| TDD | Time division duplexing |
| FDD | Frequency division duplexing |
| AI | Artificial intelligence |
| ML | Machine learning |
| MCS | Modulation and coding scheme |
| IE | Information element |
| BS | Base station |
| RRC | Radio resource control |
| UCI | Uplink control information |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

receiving, by a user equipment from a first radio access network node, a first fake base station barring configuration comprising at least one barring criterion;

receiving, by the user equipment from a second radio access network node, a signal;

analyzing, by the user equipment, the signal with respect to the at least one barring criterion to result in an analyzed signal;

receiving, by the user equipment from a third radio access network node, a second fake base station barring configuration;

determining, by the user equipment, that the first fake base station barring configuration and the second fake base station barring configuration are a same configuration; and based on the analyzed signal being determined to satisfy the at least one barring criterion, facilitating, by the user equipment with respect to the second radio access network node, performance of a first communication action, wherein the performance of the first communication action is based on the first fake base station barring configuration and the second fake base station barring configuration having been determined to be the same configuration.

2. The method of claim 1, wherein the at least one barring criterion comprises a signal strength coverage criterion.

3. The method of claim 1, wherein the at least one barring criterion comprises a timing advance criterion.

4. The method of claim 1, wherein the third radio access network node corresponds to a first signal strength, and wherein the configured communication action criterion specifies a connection, by the user equipment, to one of a set of radio access network nodes, wherein the user equipment determines that the set of radio access network nodes corresponds to a set of respective signal strengths above a configured signal strength threshold, wherein with respect to which the user equipment determines that the set of respective signal strengths corresponds to a strongest signal strength of the respective signal strengths, and wherein the method further comprises: initiating, by the user equipment, establishing a connection with a fifth radio access network node that corresponds to a second signal strength that is less strong than the first signal strength.

5. The method of claim 1, wherein the first fake base station barring configuration is received from the first radio access network node via a radio resource control release message.

6. The method of claim 1, wherein the first fake base station barring configuration is received from the first radio access network node via a system information block message.

7. The method of claim 1, further comprising:

based on the first fake base station barring configuration and the second fake base station barring configuration having been determined to be the same configuration, overriding, with the first fake base station barring configuration by the user equipment, a third fake base station barring configuration, wherein the user equipment received the third fake base station barring configuration before receiving the first fake base station barring configuration or the second fake base station barring configuration.

8. The method of claim 1, further comprising:

receiving, by the user equipment from a fourth radio access network node, a third fake base station barring configuration;

determining, by the user equipment, that the first fake base station barring configuration and the third fake base station barring configuration are different configurations; and based on the first fake base station barring configuration and the third fake base station barring configuration having been determined to be different; avoiding, by the user equipment, operation with respect to the fourth radio access network node according to the third fake base station barring configuration.

9. The method of claim 1, wherein the at least one barring criterion comprises an identifier corresponding to the second radio access network node, and wherein the communication action comprises avoiding selecting the second radio access network node.

10. A user equipment, comprising:

at least one processor configured to:

select a first radio access network node according to a configured selection criterion;

receive, from the first radio access network node, a fake base station barring configuration comprising at least one barring criterion;

determine a second radio access network node to be selected according to the configured selection criterion;

analyze at least one measured parameter value, corresponding to the second radio access network node, with respect to the at least one barring criterion to result in at least one analyzed measured parameter value;

determine that the at least one analyzed measured parameter value satisfies the at least one barring criterion based on the at least one analyzed measured parameter value being determined to satisfy the at least one barring criterion, avoid selecting the second radio access network node based on the at least one analyzed measured parameter value being determined to satisfy the at least one barring criterion;

wherein the at least one measured parameter value, corresponding to the second radio access network node, is at least one first measured parameter value, wherein the at least one analyzed measured parameter value comprises a first analyzed parameter value, and wherein the at least one processor is further configured to:

determine a third radio access network node to be selected according to the configured selection criterion;

analyze at least one second measured parameter value, corresponding to the third radio access network node, with respect to the at least one barring criterion to result in at least one second analyzed measured parameter value; and based on the at least one second analyzed measured parameter value being determined not to satisfy the at least one barring criterion, select the third radio access network node.

11. The user equipment of claim 10, wherein the at least one processor is further configured to:

establish, with the third radio access network node, a communication session; and transmit, to the third radio access network node, an identifier corresponding to the second radio access network node to be usable by the third radio access network node to facilitate updating the fake base station barring configuration to result in an updated fake base station barring configuration that comprises an indication that the second radio access network node is a barred fake base station.

12. A non-transitory machine-readable medium, comprising executable instructions that, when executed by at least one processor of a user equipment, facilitate performance of operations, comprising:

receiving, from a first radio access network node, a fake base station barring configuration comprising at least one barring criterion;

receiving, from a second radio access network node, a broadcast signal;

analyzing, at least one signal characteristic corresponding to the broadcast signal with respect to the at least one barring criterion to result in an analyzed signal characteristic; and in response to the analyzed signal characteristic being determined to satisfy the at least one barring criterion, initiating, with respect to the second radio access network node, a communication action, wherein the at least one barring criterion comprises a configured timing advance, wherein the analyzed signal characteristic comprises a measured timing advance value corresponding to the second radio access network node, wherein satisfaction of the at least one barring criterion comprises the measured timing advance value corresponding to the second radio access network node being determined not to exceed the configured timing advance, and wherein the communication action comprises avoiding establishing a communication session with the second radio access network node.

13. The non-transitory machine-readable medium of claim 12, wherein the second radio access network node corresponds to a first signal strength, wherein the communication action further comprises establishing a communication session with a third radio access network node that corresponds to a second signal strength, and wherein the first signal strength is greater than the second signal strength.

14. The non-transitory machine-readable medium of claim 13, the operations further comprising, transmitting, to the third radio access network node, the first signal strength, the measured timing advance value corresponding to the second radio access network node, and an identifier corresponding to the second radio access network node to be usable by the third radio access network node to facilitate updating a fake base station barring configuration learning model to result in an updated fake base station barring configuration.

15. The method of claim 1, wherein the first radio access network node and at least one of the second radio access network node or the third radio access network node exchange fake base station access barring configuration information usable to generate the first fake base station barring configuration and the second fake base station barring configuration.

16. The method of claim 15, wherein the first fake base station barring configuration or the second fake base station barring configuration comprises at least one updated fake base station barring radio performance reporting information object.

17. The method of claim 15, further comprising:
transmitting, by the user equipment, at least one radio performance indication to at least one of the first radio access network node or the second radio access network node, wherein the at least one updated fake base station barring radio performance reporting information object is generated by at least one artificial intelligence machine learning model based on the radio performance indications.

18. The non-transitory machine-readable medium of claim 12, wherein the first radio access network node the second radio access network node exchange fake base station access barring configuration information usable to generate the first fake base station barring configuration.

19. The method of claim 8, further comprising: overriding a configured communication action criterion; and avoiding, by the user equipment, selecting the fourth radio access network node.

20. The method of claim 8, further comprising: overriding, by the user equipment, applicability of a configured communication action criterion; and avoiding, by the user equipment, connecting to the third radio access network node.

* * * * *